United States Patent [19]
Tanaka et al.

[11] Patent Number: 5,159,042
[45] Date of Patent: Oct. 27, 1992

[54] POLYSILANE COMPOUNDS AND ELECTROPHOTOGRAPHIC PHOTOSENSITIVE MEMBERS WITH THE USE OF SAID COMPOUNDS

[75] Inventors: Hisami Tanaka, Yokohama; Harumi Sakou, Tokyo, both of Japan

[73] Assignee: Canon Kabushiki Kaisha, Tokyo, Japan

[21] Appl. No.: 548,935

[22] PCT Filed: Dec. 28, 1989

[86] PCT No.: PCT/JP89/01321

§ 371 Date: Aug. 1, 1990

§ 102(e) Date: Aug. 1, 1990

[87] PCT Pub. No.: WO90/07540

PCT Pub. Date: Jul. 12, 1990

[30] Foreign Application Priority Data

Dec. 29, 1988 [JP] Japan ................... 63-335617
May 1, 1989 [JP] Japan ................... 1-109081
May 10, 1989 [JP] Japan ................... 1-114994

[51] Int. Cl.$^5$ .................................... C08G 77/06
[52] U.S. Cl. ........................ 528/14; 528/10; 528/25; 525/474
[58] Field of Search ................. 528/10, 14, 25; 525/474

[56] References Cited

U.S. PATENT DOCUMENTS

| | | | |
|---|---|---|---|
| 4,537,942 | 8/1985 | Brown-Wensley et al. | 525/474 |
| 4,618,551 | 10/1986 | Stolka et al. | 430/58 |
| 4,772,525 | 9/1988 | Badesha et al. | 430/58 |
| 4,841,083 | 6/1989 | Nagai et al. | 528/10 |
| 4,873,297 | 10/1989 | Rengstl | 525/474 |

FOREIGN PATENT DOCUMENTS

| | | |
|---|---|---|
| 53-101099 | 9/1978 | Japan . |
| 60-098431 | 6/1985 | Japan . |
| 60-119550 | 6/1985 | Japan . |
| 62-269964 | 11/1987 | Japan . |
| 63-38033 | 7/1988 | Japan . |

OTHER PUBLICATIONS

Translation of 53-101099 Takamisawa et al. Sep. 4, 1978 "Methylalkylpolysilane Production".
Derwent Publications 89-203123/28 Abstract "1,1,2--Trimethyl-1-alk(en)yl polysilane".
JACS, vol. 46, pp. 2291-2305 (1924), Adkins et al. "Organic Reactions at the Surfaces of Dehydrogenating Catalysts."
JACS, vol. 94, pp. 3806-3811 (1972), Pitt et al. "Nature of the Electronic Interactions in Aryl-Substituted Polysilanes."
J. A. Cer. Soc., vol. 61, No. 11-12, pp. 504-508, (1978) Mazdiyasni et al. "Characterization of Organosilicon-Infiltrated Porous Reaction-Sintered" $Si_3N_4$.
J. Pol. Sci., vol. 22, pp. 159-170 (1984), Zhang et al., "Organisilane Polymers: . . . ".
Phys. Rev. B, vol. 35, No. 6, pp. 2818-2822 (1987), Kepler et al., "Photocarrier Generation and Transport . . .".

*Primary Examiner*—Melvyn I. Marquis
*Assistant Examiner*—Margaret W. Glass
*Attorney, Agent, or Firm*—Fitzpatrick, Cella, Harper & Scinto

[57] ABSTRACT

There are provided a new polysilane compound having a weight average molecular weight of 6000 to 200,000, having neither chlorine radical nor other radicals resulted from side reaction, and all the Si radicals of which not having any oxygen, and a process for the production thereof.

Said polysilane compound can be utilized in the preparation of various electronic devices, medical devices, etc., thus it is a high molecular substance which has a high industrial value in use.

There is also provided an electrophotographic photosensitive member having a light receiving layer containing said polysilane compound.

4 Claims, 1 Drawing Sheet

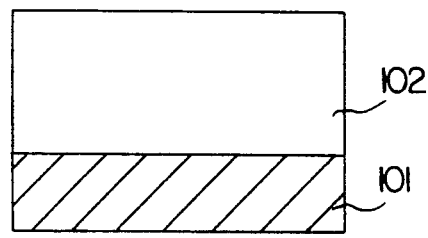
F I G. 1
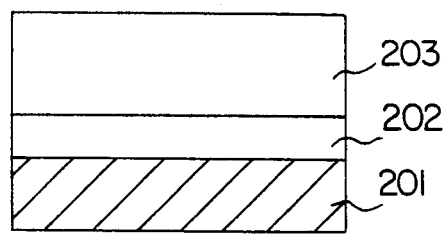
F I G. 2
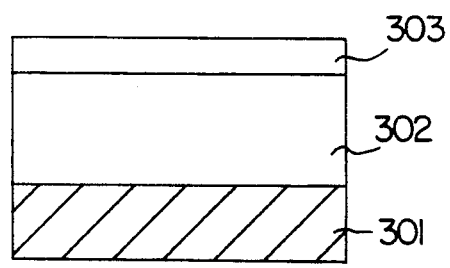
F I G. 3

POLYSILANE COMPOUNDS AND ELECTROPHOTOGRAPHIC PHOTOSENSITIVE MEMBERS WITH THE USE OF SAID COMPOUNDS

FIELD OF THE INVENTION

The present invention relates to a new polysilane compound and a process for the production thereof. The present invention also relates to an electrophotographic photosensitive member wherein an organic material is used. More particularly, the present invention relates to an electrophotographic photosensitive member having a light receiving layer formed with the use of a new polysilane compound capable of providing improved electrophotographic characteristics.

BACKGROUND OF THE INVENTION

In The Journal of American Chemical Society, 125, pp. 2291 (1924), polysilanes were reported to be insoluble in solvents. In recent years, since it was reported in The Journal of American Ceramic Society, 61, pp. 504 that polysilanes are soluble in solvents and films can be made of them, the public attention has been focussed on polysilanes. Japanese Unexamined Patent Publications Sho. 60(1985)-98431 and Sho. 60(1985)-119550 disclose polysilanes which can be dissociated with ultraviolet rays and utilization of them in resists. Further, Physical Review B 35, pp. 2818 (1987) discloses polysilanes having photosemiconductor characteristics in which carriers are mobile due to bonds of their principal chains. These polysilanes are expected to be usable also in electrophotographic photosensitive members. However, in order that polysilane compounds be applicable in electronic materials, those polysilane compounds are required to be such that they are soluble in solvents and capable of providing films which are not accompanied by minute defects and excel in homogeneity. The electronic materials should not be accompanied by any minute defects and because of this, polysilane compounds to be used in the preparation of such electronic materials are required to be high quality polysilane compounds, which can be structurally defined also with respect to substituents and do not cause any abnormality upon film formation.

There have been various reports of the synthesis of polysilane compounds. Those polysilane compounds are still reported to be problematic in using them in electronic materials. In The Journal of American Chemical Society 94(11), pp. 3806 (1972) and Japanese Patent Publication Sho. 63(1988)-38033, there are disclosed low-molecular weight polysilane compounds in with all the Si radicals being substituted by organic groups. Those described in the former literature are of the structure in which the end group of dimethylsilane is substituted by a methyl group. Those described in the latter literature are of the structure in which the end group of dimethylsilane is substituted by an alcoxy group. Any of them is 2 to 6 in degree of polymerization and does not exhibit characteristics as the polymer. Particularly in this respect, none of them has an ability of forming a film as it is, and is therefore, not industrially applicable. High-molecular weight polysilane compounds of the structure in which all the Si radicals are substituted by organic groups have been recently reported in Nikkei New Material, pp. 46, Aug. 15 of 1988. These are synthesized through specific intermediates to cause reduction in their yield and it is difficult to mass-produce these on the industrial scale.

In addition, methods of synthesizing polysilane compounds have been reported by The Journal of Organometallic Chemistry, pp. 198 C27 (1980) and The Journal of Polymer Science, Polymer Chemistry Edition vol. 22, pp. 159-170(1984). However, any of these synthetic methods is directed only to condensation reaction of the polysilane principal chain but does not touch upon the end groups. In any of these synthetic methods, unreacted chlorine radicals and by-products due to side reactions are caused and it is difficult to stably obtain polysilane compounds as desired.

Use of such polysilane compounds as described above as a photoconductive material has been proposed by U.S. Pat. No. 4,618,551, U.S. Pat. No. 4,772,525 and Japanese Unexamined Patent Publication Sho. 62(1987)-269964. However, in any of these cases, occurrence of undesirable negative effects due to said unreacted chlorine radicals and said by-products caused by side reactions are considered.

In U.S. Pat. No. 4,618,551, the foregoing polysilane compounds are used in electrophotographic photosensitive members and an extremely high voltage of 1000 V is applied upon use of those photosensitive members, although a voltage of 500 to 800 V is applied in an ordinary electrophotographic copying machine.

It is considered that this is done in order to prevent occurrence of spotted abnormal phenomena on images reproduced since defects due to the structural defects of the polysilane compound will be caused in the electrophotographic photosensitive member at an ordinary potential. In Japanese Unexamined Patent Publication Sho. 62(1987)-269964, electrophotographic photosensitive members are prepared by using the foregoing polysilane compounds and a photosensitivity is observed for each of them. However, none of those electrophotographic photosensitive members is not sufficient in photosensitivity and is inferior to the known selenium photosensitive member or the known organic photosensitive member in any respect.

There are a number of unsolved problems for any of the known polysilane compounds to be utilized in the electronic materials. Thus, any polysilane compound which can be desirably used for industrial purposes has not yet been realized.

SUMMARY OF THE INVENTION

An object of the present invention is to provide a new polysilane compound of a weight average molecular weight in the range of from 6000 to 200,000 in which all the substitutional groups and end groups are substituted by specific organic groups and a method for the production thereof.

Another object of the present invention is to provide said polysilane compound which has a good solubility in solvents and has an excellent film-forming ability, and a method for the production thereof.

A further object of the present invention is to provide an electrophotographic photosensitive member having a light receiving layer formed of an organic photoconductive material, which satisfies various requirements desired for an electrophotographic photosensitive member.

A further object of the present invention is to provide an electrophotographic photosensitive member having a light receiving layer formed of a new polysilane compound, which excels in sensitivity and durability.

A further object of the present invention is to provide an electrophotographic photosensitive member having a light receiving layer formed of a new polysilane compound which has a good solubility in solvents and an excellent film-forming ability.

A further object of the present invention is to provide the foregoing polysilane compound which is usable in the preparation of various electronic devices and medical devices, and a method for the production of said compound.

The present invention is to attain the above objects and to provide a new polysilane compound having a weight average molecular weight in the range of from 6000 to 200,000 which is represented by the following formula (I) a method for the production thereof.

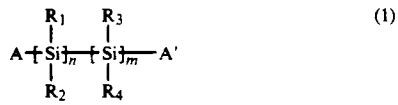

Wherein, $R_1$ stands for an alkyl group of 1 to 2 carbon atoms; $R_2$ stands for an alkyl group, cycloalkyl group, aryl group or aralkyl group of 3 to 8 carbon atoms; $R_3$ stands for an alkyl group of 1 to 4 carbon atoms; $R_4$ stands for an alkyl group of 1 to 4 carbon atoms; A and A' respectively stands for an alkyl group, cycloalkyl group, aryl group or aralkyl group of 4 to 12 carbon atoms wherein the two substituents may be the same or different one from the other; and each of n and m is a mole ratio showing the proportion of the number of respective monomers versus the total of the monomers in the polymer wherein $n+m=1$, $0<n\leq 1$ and $0\leq m<1$.

The polysilane compound according to the present invention which has a weight average molecular weight in the range of from 6000 to 200,000 and is expressed by the formula (I) has neither chlorine-containing group nor side reaction—causing group in which all the Si radicals being substituted by specific organic groups not containing any oxygen atom. The polysilane compound is not noxious, easily soluble in aromatic solvents such as toluene, benzene, xylene, etc., halogenated solvents such as dichloromethane, dichloroethane, chloroform, carbon tetrachloride, etc., and other solvents such as tetrahydrofuran (THF), dioxane, etc., and has an excellent film-forming ability.

The film formed of the polysilane compound according to the present invention is homogenous, uniform in thickness, has an excellent heat resistance and excels in hardness and toughness.

The polysilane compound to be provided according to the present invention can be employed in the preparation of various electronic devices, medical devices, etc., and thus it is a high molecular compound of high industrial value in use.

The foregoing electronic device includes organic photoconductive members, electric conductive members, photoresists, light information memory elements, etc. The foregoing medical device includes artificial organ, artificial blood vessel, transfusion bag, etc.

As described above, the polysilane compound to be provided according to the present invention is represented by the foregoing formula (I) and has a weight average molecular weight in the range of from 6000 to 200,000. In a preferred embodiment in the viewpoints of desirable solubility in solvents and desirable film-forming ability, the polysilane compound has a weight average molecular weight preferably in the range of from 8000 to 120,000, more preferably in the range of from 10,000 to 80,000.

Polysilane compounds of less than 6000 in weight average molecular weight do not exhibit polymer characteristics and do not have a film-forming ability. On the other hand, polysilane compounds exceeding 200,000 in weight average molecular weight are poor with respect to solubility in solvents, and it is difficult to form films therefrom.

In the case where a film especially excelling in toughness is desired to be formed, it is desired to selectively use a polysilane compound of the foregoing formula (I) wherein the end groups A and A' are groups selected from the group consisting of alkyl groups having 5 to 12 carbon atoms, cycloalkyl groups, aryl groups and aralkyl groups respectively having 5 to 12 carbon atoms. The most desirable polysilane compounds of the present invention in this case are those in which the end groups A and A' are groups selected from the group consisting of alkyl groups having 5 to 12 carbon atoms and cycloalkyl groups having 5 to 12 carbon atoms.

Thus, the polysilane compound represented by the formula (I) can be used for various purposes. Especially, when it is used to form a light receiving layer of an electrophotographic photosensitive member, there can be obtained a desirable electrophotographic photosensitive member which exhibits excellent electrophotographic characteristics.

By the way, the known polysilane compounds are obtained respectively by using dichlorosilane monomers as the starting materials, subjecting said monomers to dehaloganation with the use of a Na-catalyst and polymerizing the resultants. Thus, they are mostly those that have halogen radicals at their terminals.

For any of these known halogen radical-containing polysilane compounds, when it is used to form a light receiving layer of an electrophotographic photosensitive member, the resulting electrophotographic photosensitive member unavoidably becomes such that is accompanied by the following problems and is not practically usable. That is, when the electrophotographic photosensitive member having a light receiving layer formed of such known halogen radical-containing polysilane compound is engaged in the electrophotographic image-forming process, the halogen radicals will be traps for photocarriers to mobilize, to thereby unavoidably cause residual potential. And upon repeatedly conducting charging and exposure, said residual potential is increased and along with this, the potential in light is increased. Thus, said electrophotographic photosensitive member is poor in durability. Other than these problems, there are further problems for said electrophotographic photosensitive member. That is, when the halogen radicals contained in the known polysilane compound constituting the photosensitive member are Cl radicals, the Cl radicals react with water in the case where it is present, to generate hydrogen chloride gas. Said hydrogen chloride corrodes the conductive portion of the substrate of the electrophotographic photosensitive member having the light receiving layer disposed on said conductive portion and said conductive portion becomes non-conductive to cause defects on an image to be reproduced.

However, as a result of examining an electrophotographic photosensitive member prepared by using the foregoing polysilane compound of the formula (I) to form the light receiving layer thereof, the following facts have been found. That is, (a) said electrophotographic photosensitive member has a high sensitivity and provides high quality copied images; (b) any undesirable trap is not caused, the residual potential upon exposure is extremely small; (c) an excellent charge transportation layer can be realized; and (d) when the foregoing polysilane compound is used in combination with a charge generating material, an electrophotographic photosensitive member excelling in the electrophotographic characteristics can be obtained as desired.

BRIEF DESCRIPTION OF THE DRAWINGS

FIG. 1 is a schematic cross-section view illustrating the constitution of an electrophotographic photosensitive member having a single-layered light receiving layer according to the present invention.

FIGS. 2 and 3 are schematic cross-section views respectively illustrating the constitution of an electrophotographic photosensitive member having a multilayered light receiving layer according to the present invention.

DESCRIPTION OF THE PREFERRED EMBODIMENTS

Synthesis of new polysilane compounds according to the present invention and examples of said polysilane compounds The foregoing new polysilane compound to be provided by the present invention can be synthesized in the following manner. That is, under high purity inactive atmosphere containing neither oxygen nor water, dichlorosilane monomer in a solvent is contacted with a condensation catalyst comprising an alkaline metal to conduct dehalogenation and condensation polymerization, to thereby synthesize an intermediate polymer. The intermediate polymer thus obtained is separated from unreacted monomer and is reacted with a selected halogenating organic reagent in the presence of a condensation catalyst comprising an alkaline metal to condense an organic group to the terminals of the intermediate polymer, thereby obtaining the polysilane compound.

In the above synthesizing process, as any of the foregoing dichlorosilane monomer, intermediate polymer, halogenating organic reagent and alkaline metal condensation catalyst is highly reactive with oxygen and water, the foregoing polysilane compound of the present invention cannot be obtained under such atmosphere wherein oxygen and/or water are present.

Therefore, the foregoing procedures of obtaining the polysilane compound of the present invention is necessary to be carried out under the atmosphere containing neither oxygen nor water. Thus, due care is to be taken that all the reagents to be used and the reaction vessel to be used contain neither oxygen nor water and the reaction system is not incorporated with oxygen or/and water during the synthesizing process. Specifically, with respect to the reaction vessel to be used, it is subjected to vacuum suction and argon gas substitution in a blow box, whereby eliminating adsorption of water or/and oxygen in the inside of said vessel.

As for the argon gas used in any case, it is necessary that argon gas is dehydrated by passing it through a silica gel column, oxygen is then removed therefrom by passing the dehydrated gas through a column charged with copper power which is maintained at 100° C. and the argon gas thus treated is used. Likewise, as for the dichlorosilane monomer, prior to its introduction into the reaction system, oxygen is removed therefrom by subjecting it to vacuum distillation with the use of said treated argon gas free of oxygen, and thereafter it is introduced into the reaction system.

The halogenating organic reagent to be used and the solvent to be used are also treated to be free of oxygen in the same manner as in the above case of treating the dichlorosilane monomer and they are introduced into the reaction system. As for the solvent, it is desired to be treated such that after being subjected to vacuum distillation with the use of the foregoing argon gas, the solvent is further treated with metallic sodium to be completely free of water.

As the foregoing condensation catalyst, a wire-like shaped alkaline metal or chipped alkaline metals are used. In order to obtain said wired alkaline metal or chipped alkaline metals, the starting alkaline metal is wired or chipped in a paraffinic solvent free of oxygen and the resultant is used while take care not to cause oxidation thereof.

As the starting dichlorosilane monomer to be used for producing the new polysilane compound of the foregoing formula (I) according to the present invention, there is selectively used a silane compound represented by the formula: $R_1R_2SiCl_2$ which will be later detailed or in addition, also selectively used a silane compound represented by the formula: $R_3R_4SiCl_2$ which will be later detailed.

As the foregoing condensation catalyst, it is desired to use an alkaline metal capable of causing dehalogenation and providing condensation reaction. Specific examples of such alkaline metal are lithium, sodium and potassium, among these, lithium and sodium being the most preferred.

The foregoing halogenating organic reagent is used for the introduction of a substituent represented by the A and a substituent represented by the A'. As such halogenating organic reagent, there is used a relevant compound selected from the group consisting of halogenated-alkyl compounds, halogenated-cycloalkyl compounds, halogenated-aryl compounds and halogenated-aralkyl compounds, that is, a relevant compound selected from the compounds represented by the general formula: A—X and/or a compound selected from the compounds represented by the general formula: A'—X (wherein X is Cl or Br) which will be later shown.

As for the foregoing dichlorosilane monomer represented by the general formula: $R_1R_2SiCl_2$ or the dichlorosilane monomer represented by the general formula: $R_3R_4SiCl_2$ which is additionally used, they are dissolved in predetermined solvents and introduced into the reaction system. As such solvent, it is desirable to us nonpolar paraffinic hydrocarbon solvents. Specific examples of such nonpolar solvent are n-hexane, n-octane, n-nonane, n-dodecane, cyclohexane, cyclooctane, etc.

The intermediate polymer synthesized is insoluble in any of these solvents and thus, it can be effectively separated from the unreacted dichlorosilane monomer.

At the time of reacting the intermediate polymer separated from the unreacted dichlorosilane monomer with the halogenating organic reagent, they are dissolved in the same solvent and they are reacted. In this case, there is desirably used an aromatic solvent such as benzene, toluene, xylene, etc. as said solvent.

In order to obtain a desired intermediate by condensating the foregoing dichlorosilane monomer with the use of the foregoing alkaline metal catalyst, the polymerization degree of the resulting intermediate polymer can be controlled as desired by properly adjusting the reaction temperature and the reaction period of time. However, as for the reaction temperature, it is desired to be regulated in the range of from 60° C. to 130° C.

A preferred embodiment of the method for producing the foregoing new polysilane compound represented by the formula (I) according to the present invention is to be explained in the following.

That is, the method for producing said new polysilane compound according to the present invention comprises the steps of: (i) producing the intermediate polymer and (ii) introducing the substituents A and A' to the terminals of said intermediate polymer.

The step (i) can be carried out as follows. That is, the inside of the reaction system of the reaction vessel is made substantially free of oxygen and water, charged with argon gas and the gas pressure thereof is maintained at a predetermined value. A paraffinic solvent free of oxygen and a condensation catalyst free of oxygen are introduced into the reaction system, and dichlorosilane monomer(s) free of oxygen is introduced thereinto. The reactants thus introduced into the reaction system were heated to a predetermined temperature while mixing them to cause condensation of said monomer. In this case, the condensation degree of said dichlorosilane monomer is controlled as desired by properly regulating the reaction temperature and the reaction period of time, to thereby obtain an intermediate polymer having a desired polymerization degree.

The reaction in this case is performed in the way as shown in the following reaction formula (i), wherein the chlorine radicals of the two dichlorosilane monomers and the condensation catalyst are reacted to cause dechlorination reaction wherein the Si radicals are repeatedly condensated and polymerized, whereby affording an intermediate polymer.

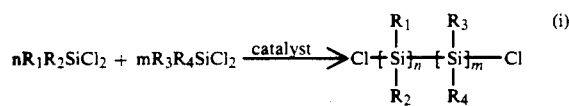

The reaction procedures in the above are made such that the condensation catalyst (alkaline metal) is firstly placed in the paraffinic solvent, into which the dichlorosilane monomers are dropwise introduced while stirring the reaction mixture and maintaining it at an elevated temperature. The polymerization degree of the resultant is confirmed by sampling the reaction liquid. The confirmation of the polymerization can be simply conducted by observing the state of the sampled reaction liquid if a film can be formed or not therefrom. When condensation proceeds to form a polymer, said polymer becomes precipitated in the form of white solid in the reaction liquid. When such white solid is precipitated as desired, the reaction liquid containing the white solid is cooled and decanted to separate the precipitate from the solvent. Thus, there is afforded an intermediate polymer. Then, the foregoing step (ii) is carried out. That is, the intermediate polymer thus obtained is subjected to dechlorination condensation with the use of the halogenating organic reagent and the condensation catalyst (alkaline metal) to thereby substitute the end groups of said intermediate polymer by predetermined organic groups. The reaction in this case is performed in the way as shown in the following reaction formula (ii).

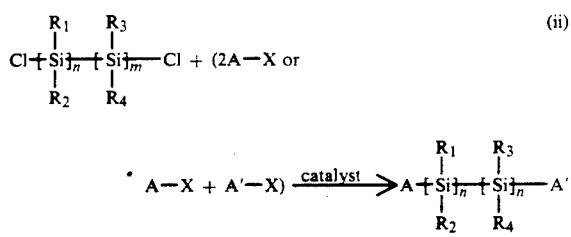

Specifically in this respect, the intermediate polymer obtained by condensation of the dichlorosilane monomers is dissolved in the aromatic solvent. Then, the foregoing condensation catalyst (alkaline metal) is added to the solution, and the foregoing halogenating organic reagent is dropwise added at room temperature. Wherein said halogenating organic reagent is added in an excessive amount of 0.01 to 0.1 folds over the amount of the starting monomer in order to compete condensation reaction between the end groups of the polymer. The reaction mixture is gradually heated, and it is stirred for an hour while maintaining a temperature of 80° C. to 100° C. to thereby perform the reaction as desired.

After the reaction is completed, methanol is added in order to remove the alkaline metal as the catalyst. Then, the resulting polysilane compound is extracted with toluene and purified by the use of a silica gel column. Thus, there is obtained an objective new polysilane compound according to the present invention.

Specific Examples of the $R_1R_2SiCl_2$ and $R_3R_4SiCl_2$

Note: Among the following compounds, compounds of a-2 to a-16, a-18, a-20, a-21, a-23 and 24 are used as the $R_1R_2SiCl_2$, and compounds of a-1, a-2, a-11, a-17, a-19, a-22, a-23, and a-25 as the $R_3R_4SiCl_2$.

| | |
|---|---|
| $(CH_3)_2SiCl_2$ | a-1 |

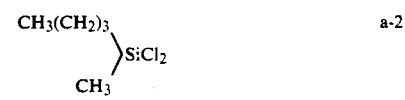

a-2

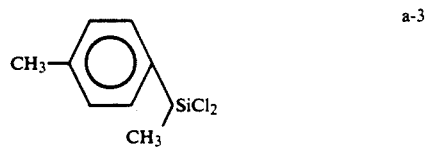

a-3

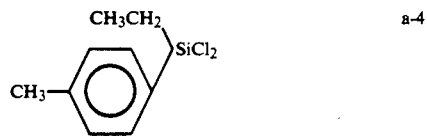

a-4

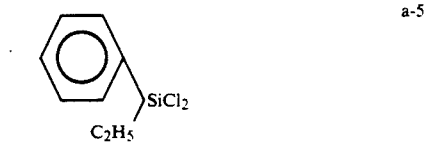

a-5

-continued
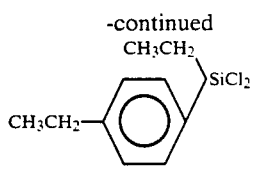 a-6
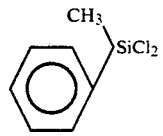 a-7
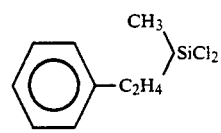 a-8
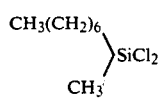 a-9
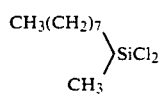 a-10
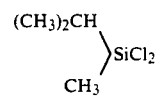 a-11
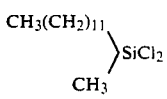 a-12
 a-13
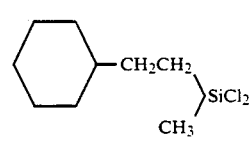 a-14
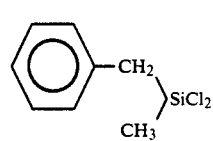 a-15
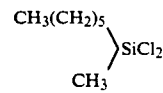 a-16
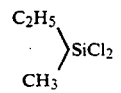 a-17
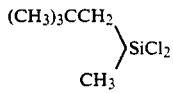 a-18
-continued
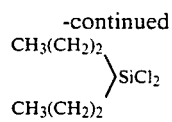 a-19
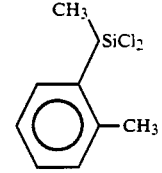 a-20
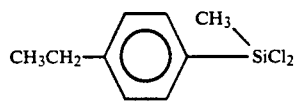 a-21
$((CH_3)_2CH)_2SiCl_2$ a-22
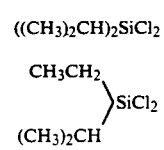 a-23
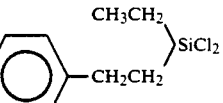 a-24
$((CH_3)_3C)_2SiCl_2$ a-25
Specific Examples of the A—X and the A'—X
| | |
|---|---|
| $(CH_3)_2CHCH_2Cl$ | b-1 |
| $CH_3(CH_2)_4Cl$ | b-2 |
| $CH_3(CH_2)_5Cl$ | b-3 |
| $CH_3(CH_2)_{10}Cl$ | b-4 |
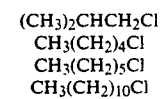 b-5
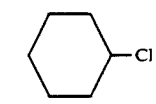 b-6
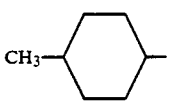 b-7
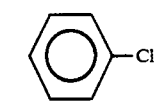 b-8
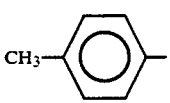 b-9
 b-10

-continued

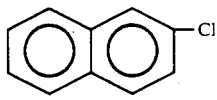 b-11

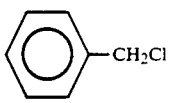 b-12

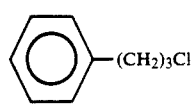 b-13

CH$_3$(CH$_2$)$_5$Br  b-14
CH$_3$(CH$_2$)$_{10}$Br  b-15

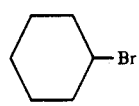 b-16

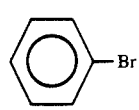 b-17

As the catalyst, alkaline metals are desirable.

There is used lithium, sodium or potassium as the alkaline metal. The shape of the catalyst is desired to be of wired form or chipped form having a large surface area.

Specific Examples of the new polysilane compound according to the present invention

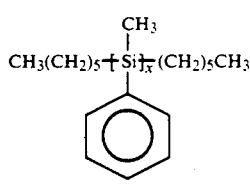 c-1

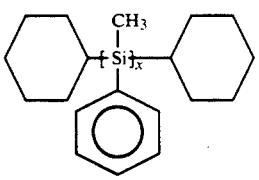 c-2

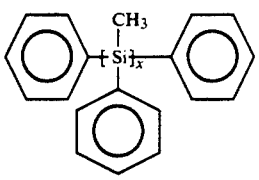 c-3

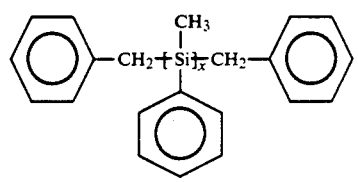 c-4

-continued

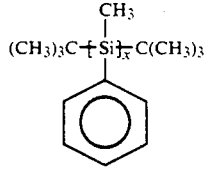 c-5

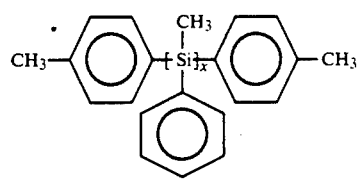 c-6

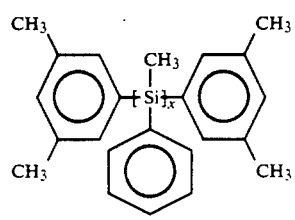 c-7

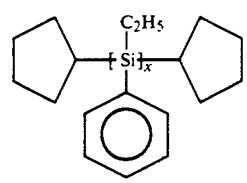 c-8

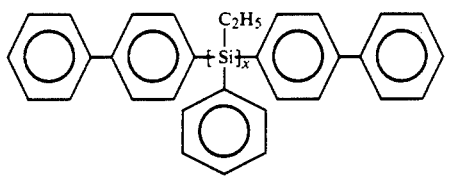 c-9

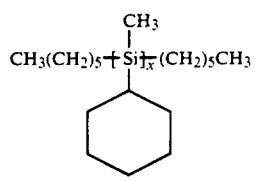 c-10

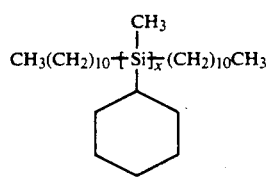 c-11

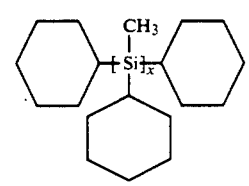 c-12

-continued
c-13
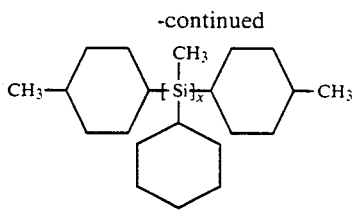
c-14
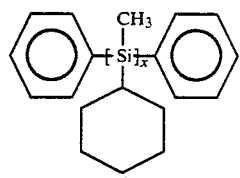
c-15
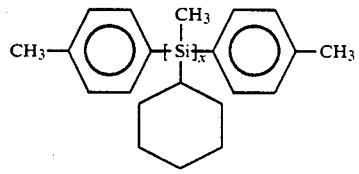
c-16
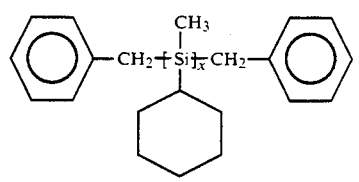
c-17
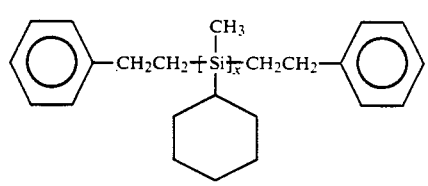
c-18
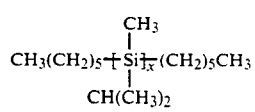
c-19
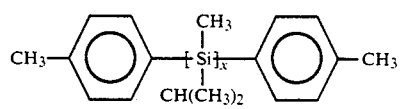
c-20
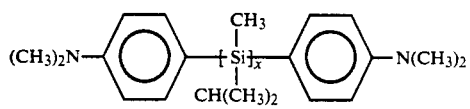
c-21
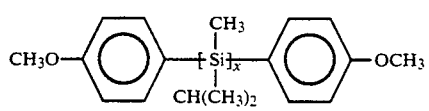
c-22
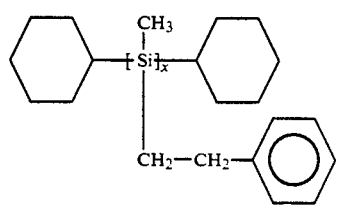
-continued
c-23
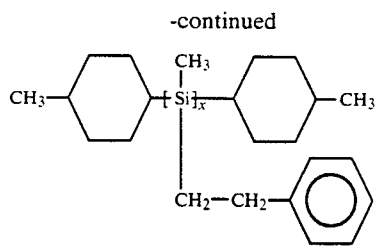
c-24
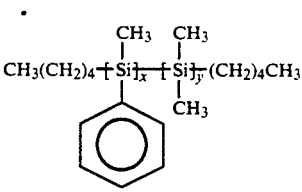
c-25
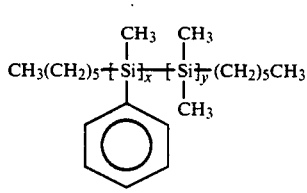
c-26
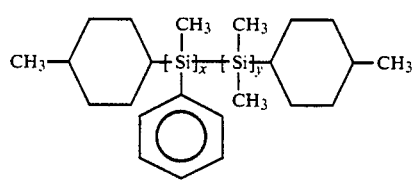
c-27
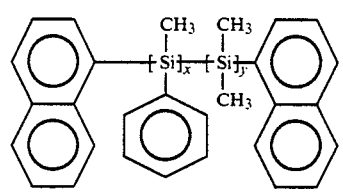
c-28
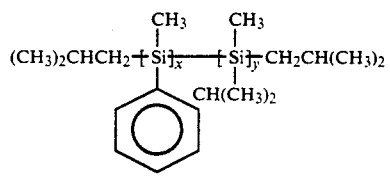
c-29
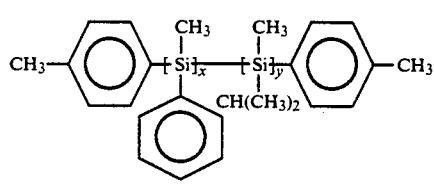
c-30
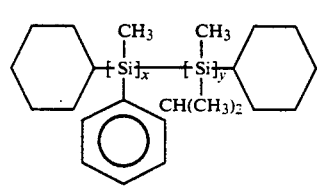

-continued

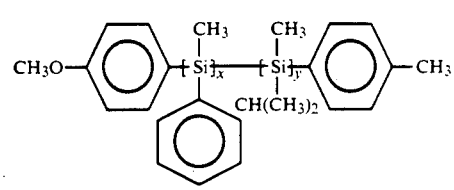
c-31

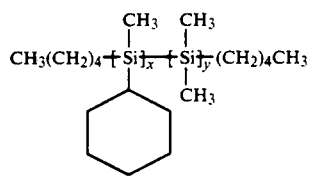
c-32

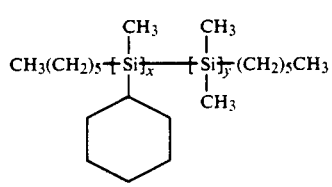
c-33

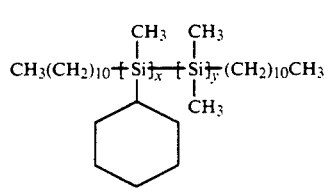
c-34

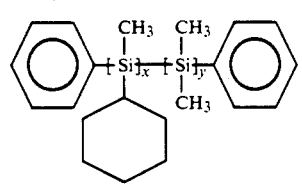
c-35

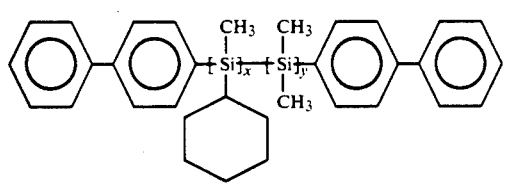
c-36

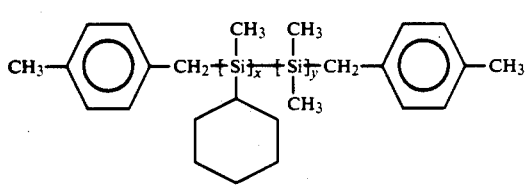
c-37

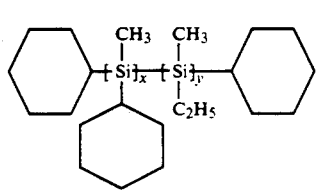
c-38

-continued

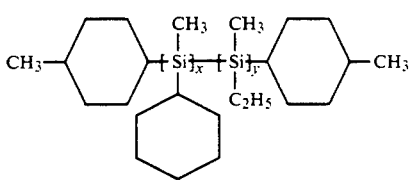
c-39

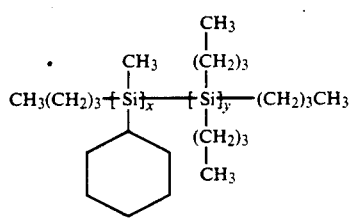
c-40

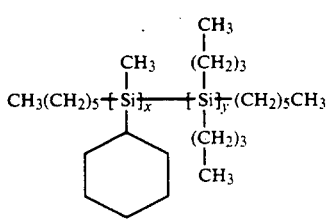
c-41

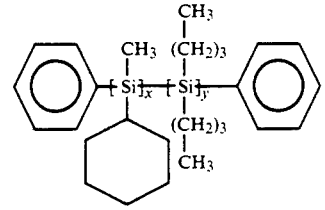
c-42

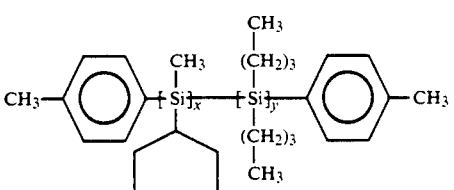
c-43

Note:
X and Y in the above structural formulas respectively stands for a polymeric unit of the monomer. n is obtained by the calculation equation: $X/(X + Y)$, and m is obtained by the calculation equation: $Y/(X + Y)$.

Electrophotographic Photosensitive Members according to the present invention

The electrophotographic photosensitive member of the present invention basically comprises an electroconductive substrate and a light receiving layer disposed on said substrate, said light receiving layer containing the foregoing polysilane compound (that is, a polysilane compound selected from C-1 to C-43 compounds). (The term "light receiving layer" in the present invention is to mean inclusively all the layers disposed on the electroconductive substrate.)

The foregoing light receiving layer may be constituted by a single layer or a plurality of functionally partitioned layers.

FIG. 1 is a cross-section view schematically illustrating the constitution of a typical example of the electrophotographic photosensitive member having a single light receiving layer according to the present invention.

In FIG. 1, numeral reference 101 stands for a electroconductive substrate and numeral reference 102 stands for a light receiving layer containing the foregoing polysilane compound. In this case, the light receiving layer 102 corresponds to a so-called photosensitive layer containing the foregoing polysilane compound [which is corresponding to a material contributing to transporting a charge (hereinafter referred to as "charge-transporting material")] and other material contributing to generating a charge (hereinafter referred to as "charge-generating material").

The electrophotographic photosensitive member of the type shown in FIG. 1 may have an undercoat layer (not shown) having a barrier function and an adhesion function between the conductive substrate and the photosensitive layer (light receiving layer 102) or a surface protective layer (not shown) capable of protecting the photosensitive layer (light receiving layer 102) on said photosensitive layer, respectively in case where necessary.

In the case of the electrophotographic photosensitive member of the configuration shown in FIG. 1, the photosensitive layer (that is the light receiving layer 102) contains the charge-generating material and the charge-transporting material (that is the foregoing polysilane compound) with a quantitative ratio (the charge-generating material: the charge-transporting material) preferably of 1:100 to 1:1, more preferably of 1:20 to 1:3, in a state that the two materials are uniformly distributed in the entire layer region thereof. The layer thickness thereof is preferably 4 to 30 μm, more preferably 7 to 20 μm.

As the foregoing charge-generating material, known organic charge-generating materials or known inorganic charge-generating materials can be selectively used. Specific examples of such organic charge-generating material are azo pigment, phthalocyanine pigment, anthanthrone pigment, quinone pigment, pyranthrone pigment, indigo pigment, quinacridine pigment, pyrrium pigment, etc. Likewise, specific examples of such inorganic charge-generating material are selenium, selenium-tellurium, selenium-arsenic, etc.

The formation of the photosensitive layer (that is the light receiving layer 102) of the electrophotographic photosensitive member of the type shown in FIG. 1 may be carried out in the following way. That is, a coating composition is first prepared by dispersing a predetermined amount of the foregoing charge-generating material in a proper solvent to obtain an emulsion, and dissolving a predetermined amount of the polysilane compound (a polysilane compound selected from the group consisting of the foregoing C-1 to C-43 compounds) in the emulsion obtained. The coating composition obtained is applied onto the surface of an electroconductive substrate in an amount which provides a predetermined thickness for the layer resulted after dried by an appropriate coating means to thereby form a liquid coat on said surface, which is followed by drying and solidifying by a conventional means. As the solvent used in this case, there can be illustrated aromatic solvents such as benzene, toluene, xylene, etc., halogenic solvents such as dichloromethane, dichloroethane, chloroform, etc., and other than these, tetrahydrofuran, dioxane, etc.

As the foregoing coating means, there can be illustrated a wire bar coating method, a dip coating method, a doctor blade coating method, a spray coating method, a roll coating method, a bead coating method, a spin coating method, etc.

In the case where the foregoing undercoat layer is disposed in the electrophotographic photosensitive member of the type shown in FIG. 1, its thickness is desired to be preferably in the range of from 4 to 30 μm, more preferably in the range of from 7 to 20 μm.

The undercoat layer is formed of a relevant material selected from the group consisting of casein, polyvinylalcohol, nitrocellulose, polyamides (nylon 6, nylon 66, nylon 610, copolymerized nylon, alcoxymethylated nylon, etc.), polyurethane and aluminum oxide.

The formation of the undercoat layer may be carried out by dissolving the undercoat layer-forming material in a solvent to prepare a coating liquid when said material is soluble in a solvent or dispersing the undercoat layer-forming material in a solution containing binder resin when said material is insoluble in a solvent, to thereby prepare a coating composition, and applying said coating liquid or said coating composition onto the surface of the electroconductive substrate 101 to form a liquid coat on said surface, followed by drying and solidifying in the same manner as in the case of forming the photosensitive layer.

In the case of disposing the foregoing surface protective layer in the electrophotographic photosensitive member of the type shown in FIG. 1, its thickness is desired to be 0.1 to 5 μm. The surface protective layer is formed of a resin such as polycarbonate A, polycarbonate Z, polyacrylate, polyester, polymethylacrylate, etc. The surface protective layer may contain an appropriate additive such as resistance-controlling agent, antideteriorating agent, etc. The formation of the surface protective layer may be carried out by dissolving the foregoing resin in a relevant solvent to prepare a coating liquid, and applying the coating liquid onto the surface of the previously formed photosensitive layer to form a liquid coat on said surface, followed by drying and solidifying in the same manner as in the case of forming of the photosensitive layer.

In the case where the resistance-controlling agent or the anti-deteriorating agent is incorporated into the surface protective layer, such additive is uniformly dispersed in the foregoing coating liquid for the formation of the surface protective layer and as a result of this, the resulting surface protective layer will contain such additive.

The electrophotographic photosensitve member having a light receiving layer comprising a plurality of functionally partitioned layers according to the present invention typically takes the configuration shown in FIG. 2 or the configuration shown in FIG. 3. Specifically, the electrophotographic photosensitive member of the configuration shown in FIG. 2 according to the present invention has, on an electroconductive substrate 201, a charge-generating layer 202 containing a charge-generating material and a charge-transporting layer 203 containing the foregoing polysilane compound being stacked in this order from the side of said substrate 201.

The electrophotographic photosensitive member of the configuration shown in FIG. 3 according to the present invention has, on an electroconductive substrate 301, a charge-transporting layer 302 containing the foregoing polysilane compound and a charge-generating layer 303 containing a charge-generating material being stacked in this order from the side of said substrate 301.

Each of the electrophotographic photosensitive member having the configuration shown in FIG. 2 and the electrophotographic photosensitive member having the configuration shown in FIG. 3 according to the present invention may have an undercoat layer (not shown) or/and a surface protective layer (not shown) as well as the electrophotographic photosensitive member having the configuration shown in FIG. 1.

That is, as for the undercoat layer, it is disposed between the electroconductive substrate 201 and the charge-generating layer 202 in the case of the electrophotographic photosensitive member having the configuration shown in FIG. 2. In the case of the electrophotographic photosensitive member having the configuration shown in FIG. 3, it is disposed between the electroconductive substrate 301 and the charge-transporting layer 302.

And, as for the surface protective layer, it is disposed on the charge-transporting layer 203 in the case of the electrophotographic photosensitive member having the configuration shown in FIG. 2. In the case of the electrophotographic photosensitive member having the configuration shown in FIG. 3, it is disposed on the charge-generating layer 303.

In the electrophotographic photosensitive members shown in FIG. 2 and FIG. 3 respectively having the charge-generating layer (202 or 303) and the charge-transporting layer (203 or 302), the thickness of each of the two layers is one of the important factors in order for these electrophotographic photosensitive members to exhibit desired electrophotographic characteristics. That is, in the case of the electrophotographic photosensitive member shown in FIG. 2, it is desired that the charge-generating layer 202 is made preferably 0.01 to 5 $\mu$m thick, more preferably 0.05 to 2 $\mu$m thick, and the charge-transporting layer 203 is made preferably 4 to 30 $\mu$m thick, more preferably 9 to 20 $\mu$m thick.

In the case of the electrophotographic photosensitive member, it is desired that the charge-transporting layer 302 is made preferably 4 to 30 $\mu$m thick, more preferably 7 to 20 $\mu$m thick, and the charge-generating layer 303 is made preferably 1 to 15 $\mu$m thick, more preferably 3 to 10 $\mu$m thick.

In the case of disposing the undercoat layer in the electrophotographic photosensitive member shown in FIG. 2 or FIG. 3, its thickness is preferably 4 to 30 $\mu$m, more preferably 7 to 20 $\mu$m. Likewise, in the case of disposing the surface protective layer, its thickness is preferably 0.1 to 5 $\mu$m.

As the charge-generating material to be contained in the charge-generating layer 202 or 303, known organic charge-generating materials or known inorganic charge-generating materials can be used. Specific examples of such organic charge-generating material are azo pigment, phthalocyanine pigment, anthanthrone pigment, quinone pigment, pyranthrone pigment, indigo pigment, quinacridone pigment, pyrrium pigment, etc. Likewise, specific examples of such inorganic charge-generating material are selenium, selenium-tellurium, selenium arsenic, etc.

The charge-generating layer 202 or 303 can be formed by a conventional method of evaporating the foregoing charge-generating material or a conventional method of preparing a coating composition containing the foregoing charge-generating material, applying the coating composition, drying and solidifying the resulting liquid coat. Among these two method, the latter is the most desirable. In the latter method, distribution of the charge-generating material into a charge-generating layer to be formed in a desirable state can be easily attained. In a detailed embodiment of the latter method, a relevant dispersing medium is provided, the foregoing charge-generating material is introduced together with said dispersing medium into a relevant solvent to prepare a coating composition in which said charge-generating material being uniformly dispersed, this coating composition is applied to form a liquid coat, and the liquid coat is dried and solidified, whereby forming the charge generating layer 203 or 303.

Desirable examples of said dispersing medium can include so-called binder resins such as insulating resins, organic photoconductive polymers, etc. Specific examples of such binder resin are polyvinyl butyral, polyvinyl benzal, polyacrylate, polycarbonate, polyester, phenoxy resin, cellulose resin, acryl resin, polyurethane, etc. Other than these, it is possible to use the foregoing polysilane compound according to the present invention as the dispersing medium.

In any case, the amount of the dispersing medium to be used is preferably 80% by weight or less, more preferably 40% by weight or less respectively in terms of the content (quantitative proportion) in the charge-generating layer (202 or 303) finally formed.

And as the foregoing solvent, there is selectively used an appropriate solvent in which the foregoing binder resin can be effectively dissolved and the foregoing charge-generating material can be uniformly dispersed in the binder resin dissolved. Specific examples of such solvent are ethers such as tetrahydrofuran, 1,4-dioxane, etc.: ketones such as cyclohexanone, methyl ethyl ketone, etc.: amides such as N,N-dimethylformamide, etc.: esters such as methyl acetate, ethyl acetate, etc.: aromatic compounds such as toluene, xylene, chlorobenzene, etc.: alcohols such as methanol, ethanol, 2-propanol, etc.: and aromatic carbon halides such as chloroform, methylene chloride, dichloroethylene, carbon tetrachloride, trichloroethylene, etc.

In order to form a liquid coat by applying the foregoing coating composition, a conventional coating method can be employed. As such coating method, there can be illustrated a wire bar coating method, a dip coating method, a doctor blade coating method, a spray coating method, a roll coating method, a bead coating method, a spin coating method, etc.

In order to dry and solidify the liquid coat formed, a proper drying and solidifying method such as a known air-drying method which does not damage the charge-generating layer (202 or 303) to be formed.

The charge-transporting layer 203 or 302 containing the foregoing polysilane compound can be formed in the same manner as in the case of forming the charge-generating layer (202 or 303). For example, it can be formed by dissolving in a solvent a polysilane compound selected from the foregoing compounds C-1 to C-43 with an amount of preferably 5 to 30% by weight, more preferably 10 to 20% by weight versus the amount of said solvent to prepare a coating composition, applying the coating composition to form a liquid coat, and drying and solidifying the liquid coat. As said solvent, there can be illustrated aromatic solvents such as benzene, toluene, xylene, etc., and other than these, tetrahydrofuran, dioxane, etc. The application of said coating composition and the drying and solidification of said liquid coat can be carried out in the same manner as in the case of forming the charge-generating layer (202 or 303).

In the case of disposing the undercoat layer or/and the surface protective layer in the electrophotographic photosensitive member having the configuration shown in FIG. 2 or in the electrophotographic photosensitive member having the configuration shown in FIG. 3, any of such layers can be formed in the same manner as previously described in the case of the electrophotographic photosensitive member shown in FIG. 1.

Explanation is to be made on the electroconductive substrate (101, 201, 301) in each of the electrophotographic photosensitive members shown in FIG. 1, FIG. 2 and FIG. 3.

First as for the shape thereof, it may take any configuration such as cylindrical, belt-like or plate-like shape. As for the constituent material thereof, it may be an electroconductive member or a member comprising an insulating base member applied with electroconductive treatment to one of the surfaces thereof on which a light receiving layer is to be disposed.

Examples in the former case are metal members of aluminum, copper, zinc, etc., other than these, alloy members of aluminum alloy, stainless steel, etc.

As for the latter case, there can be mentioned plastic base members of polyethylene, polypropylene, polyvinylchloride, polyethyleneterephthalate, acryl resin, etc. whose surface being applied with a metal thin film by a conventional vacuum evaporation method, said plastic base members whose surface being applied with electroconductive particles of titanium oxide, tin oxide, carbon black, silver by the use of a binder resin, and other members comprising impregnating-base members such as papers or plastic films which are impregnated with said electroconductive particles.

Other than these members, there can be used other members comprising metal base members whose surface being applied with said electroconductive particles by the use of a binder resin as the foregoing electroconductive substrate.

For any of the electrophotographic photosensitive members shown in FIGS. 1 to 3, in the case of forming a successive constituent layer on the previously formed constituent layer, it is important to selectively use a solvent which does not melt the previously formed layer.

The electrophotographic photosensitive members of the present invention above explained can be used not only in various electrophotographic copying machines but also in laser beam printers, CRT printers, LED printers, liquid crystal printers, and laser plate making.

EXAMPLES

The present invention will be described more specifically while referring to Examples, but the invention is not intended to limit the scope only to these examples.

In the following production examples and comparative production examples, as for the product obtained, the presence or absence of Cl radical was firstly observed. The product in which the presence of Cl radical was recognized was subjected to determination of the content of Cl radical. The measured content thereof was expressed by the milimolar equivalence number per 1000 g of the product.

In addition, as for the product obtained, whether it corresponds or not to a polysilane compound having a backbone chain comprising a Si—Si bonded long chain structure was observed by FT-IR and/or UV spectrum. Further in addition, the presence or absence of a side chain substituent to have been bonded was observed by FT-IR, or/and the proton in the substituent was observed by FT-NMR.

On the basis of the results obtained, the structure of the synthesized product was determined.

The foregoing observation of the presence or absence of Cl radical was performed by using a full-automatic X-ray fluorescence analyzing system 3080 (product by Rigakudenki Kohgyo Kabushiki Kaisha). Wherein, there was provided trimethylchlorosilane (product by Chisso Kabushiki Kaisha) as a reference standard, five kinds of control solutions were prepared by diluting said reference standard with respective rates of dilution of 1, 5, 10, 50 and 100 times, each of the control solutions was set to the above X-ray fluorescence analyzing system to measure the amount of Cl radical contained therein, and an analytical curve was obtained based on the measured results.

As for the product to be observed, 1 g thereof was dissolved in dehydrated toluene to obtain a specimen of 10 ml in a total amount, this was set to the above X-ray fluorescence analyzing system, and the measured result was referred to the foregoing analytical curve to obtain the amount of Cl radical.

The measurement by FT-IR was performed by preparing a KBr pellet of the specimen to be observed and setting the resultant to a Nicolet FT-IR 750 (product by Nicolet Japan Co., Ltd.).

The measurement by FT-NMR was performed by dissolving the specimen to be observed in $CDCl_3$ and setting the resultant to a FT-NMR FX-9Q (product by JEOL, Ltd.).

Additionally, Pure & Applied Chemistry 54, No. 5, pp. 1041-1050 (1982) reports with respect to UV spectra that in the case of a low molecular weight polysilane compound, its UV spectrum ranges in the short wavelength side and in the case of a high molecular weight polysilane compound, its UV spectrum ranges in the long wavelength side.

EXAMPLE 1

A three-necked flask was placed in a blow box which was vacuum-aspirated and charged with argon gas, and a reflux condenser, temperature gage and dropping funnel were provided to the device. And argon gas was passed through a by-pass pipe of the dropping funnel.

100 g of dehydrated dodecane and 0.3 moles of wire-like shaped metallic sodium were introduced into the three-necked flask and heated to 100° C. while stirring. Then, a solution prepared by dissolving 0.1 moles of dichlorosilane monomer (product by Chisso Kabushiki Kaisha)(a-7) in 30 g of dehydrated dodecane was dropwise added to the reaction system.

After its addition being completed, the reactants were subjected to condensation polymerization at 100° C. for an hour to precipitate white solids. Thereafter the resultant was cooled and the dodecane was decantated. 100 g of dehydrated toluene was added to dissolve the white solids, to which 0.01 moles of mettalic sodium was added. Then, a solution prepared by dissolving 0.01 moles of n-hexylchloride (product by Tokyokasei Kabushiki Kaisha)(b-3) in 10 ml of toluene was dropwise and slowly added to the reaction system while stirring, followed by heating at 100° C. for an hour. After cooling, 50 ml of methanol was dropwise and slowly added to treat excessive mettalic sodium. As a result, there were formed a suspended phase and a toluene phase. The toluene phase was separated, subjected to vacuum concentration, and purified by a chromatography using a silica gel column to obtain a product with the yield of 65%.

The product thus obtained was examined by the foregoing method of measuring the content of Cl radical. As a result, there was not observed any content of Cl radical (That is, 0.00 milimolar equivalence in 1000 g of the specimen.). As for the foregoing product, its weight average molecular weight was measured by subjecting the specimen to THF development in accordance with the known GPC method. It was 75,000 (wherein polystyrene was made to be the reference standard.).

Further, a KBr pellet of the foregoing product was prepared and it was set to a Nicolet FT-IR 750 (product by Nicolet Japan Co., Ltd.) to thereby measure its FT-IR. Further in addition, a specimen of the foregoing product was dissolved in $CDCl_2$ and set to a FT-NMR FX-90Q (product by JEOL, Ltd.) to measure its FT-NMR. As a result, it was found that the product does not contain any of Si—Cl bond, Si—O—Si bond and Si—O—R bond at all and corresponds to a polysilane compound having the foregoing structural formula C-I.

The above results were collectively shown in Table 4.

EXAMPLE 2

A three-necked flask was placed in a blow box which was vacuum-aspirated and charged with argon gas, and a reflux condenser, temperature gage and dropping funnel were provided to the device. Argon gas was passed through the by-pass pipe of the dropping funnel.

100 g of dehydrated dodecane and 0.3 moles of metallic lithium of 1 mm in size were introduced into the three-necked flask and heated to 100° C. while stirring. Then, a solution prepared by dissolving 0.1 moles of dichlorosilane monomer (product by Chisso Kabushiki Kaisha)(a-7) in 30 g of dehydrated dodecane was dropwise and slowly added to the reaction system. After its addition being completed, the reactants were subjected to condensation polymerization at 100° C. for an hour to precipitate white solids. The resultant was cooled and the dodecane was decanted. 100 g of dehydrated toluene was added to dissolve the white solids, to which 0.02 moles of metallic lithium was added. Then, a solution prepared by dissolving 0.02 moles of chlorobenzene (product by Tokyo Kasei Kabushiki Kaisha)(b-5) in 10 ml of toluene was dropwise and slowly added to the reaction system while stirring, followed by heating at 100° C. for an hour. After cooling, 50 ml of methanol was dropwise and slowly added to treat excessive metallic lithium. As a result, there were formed a suspended phase and a toluene phase. The toluene phase was separated, subjected to vacuum concentration, and purified by a chromatography using a silica gel column to obtain a product corresponding to a polysilane compound No. 2 (the structural formula: C-3). The yield was 72%, and its weight average molecular weight was 92,000. The determined results were shown in Table 4.

EXAMPLE 3

A three-necked flask was placed in a blow box which was vacuum-aspirated and charged with argon gas, and a reflux condenser, temperature gage and dropping funnel were provided to the device. Argon gas was passed through the by-pass pipe of the dropping funnel.

100 g of dehydrated n-hexane and 0.3 moles of metallic sodium of 1 mm in size were introduced into the three-necked flask and heated to 80° C. while stirring. Then, a solution prepared by dissolving 0.1 moles of dichlorosilane monomer (product by Chisso Kabushiki Kaisha)(a-7) in dehydrated n-hexane was dropwise and slowly added to the reaction system. After its addition being completed, the reactants were subjected to condensation polymerization at 80° C. for 3 hours to precipitate white solids. The resultant was cooled and the n-hexane was decantated. 100 g of dehydrated toluene was added to dissolve the white solids, to which 0.01 moles of metallic sodium was added. Then, a solution prepared by dissolving 0.01 moles of benzylchloride (product by Tokyo Kasei Kabushiki Kaisha)(b-12) in 10 ml of toluene was dropwise and slowly added to the reaction system while stirring, followed by heating at 80° C. for an hour. After cooling, 50 ml of methanol was dropwise and slowly added to treat excessive metallic sodium. As a result, there were formed a suspended phase and a toluene phase. The toluene phase was separated, subjected to vacuum concentration, and purified by a chromatography using a silica gel column to obtain a product corresponding to a polysilane compound No. 3 (the structural formula: C-4). The yield was 61%, and its weight average molecular weight was 47,000. The determined results were shown in Table 4.

Further, as for this polysilane compound, there was not present any IR absorption belonging to unreacted Si—Cl, or to Si—O—Si or Si—O—R of by-products.

EXAMPLES 4 and 5

The synthesizing procedures of Example 3 were repeated, except that dichlorosilane monomer and end group treating agents shown in Table 1 were used, to thereby obtain a polysilane compound No. 4 (the structural formula: C-6) and a polysilane compound No. 5 (the structural formula: C-2) with respective yields of 60% and 62%.

For any of these polysilane compounds, there was not present any IR absorption belonging to unreacted Si—Cl, or to Si—O—Si or Si—O—R of by-products.

The determined results were collectively shown in Table 4.

COMPARATIVE EXAMPLE 1

The synthesizing procedures of Example 3 were repeated, except that neither the condensation using the dichlorosilane monomer (product by Chisso Kabushiki Kaisha)(a-7) nor the end group treatment of the polymer was performed, to obtain a polysilane compound No. D-1 having the structural formula shown in Table 4. The yield was 60% and its weight average molecular weight was 46,000. The determined results were shown in Table 4.

As for this polysilane compound, there were observed IR spectra belonging to unreacted Si—Cl for the end group and belonging to Si—O—R of a by-product.

EXAMPLES 6 to 10

Polymerization was performed in the same manner as in Example 3, except for using a polysilane monomer shown in Table 2 and changing the reaction period as shown in Table 2. As the end group-treating agent, a compound shown in Table 2 was used. The product synthesized was purified in the same manner as in Example 3.

In this way, there were obtained polysilane compounds Nos. 6 to 10.

The yield, the weight average molecular weight, and the results by FT-IR and FT-NMR with respect to each of the polysilane compounds were as shown in Table 4.

For each of these polysilane compounds, there was not observed any IR absorption belonging to anreacted Si—Cl, or belonging to Si—O—Si or Si—O—R of by-products.

COMPARATIVE EXAMPLE 2

The procedures of Example 6 were repeated, except that the reaction period of the dichlorosilane monomer was made 10 minutes, to thereby obtain a polysilane compound No D-2 shown in Table 4.

The yield, the weight average molecular weight, and the results by FT-IR and FT-NMR of the resultant polysilane compound were as shown in Table 4.

For the polysilane compound, there was not observed any IR absorption belonging to unreacted Si—Cl, or belonging to Si—O—Si or Si—O—R of by-products.

EXAMPLES 11 to 14

The procedures of Example 1 were repeated, except that dichlorosilane monomers and end group-treating agents were selectively used, to thereby obtain polysilane compounds Nos. 11 to 14 shown in Table 4.

The yield, the weight average molecular weight, and the results by FT-IR and FT-NMR with respect to each of the resultant polysilane compounds were as shown in Table 4.

The copolymerized ratio of the silane monomer in each case was obtained by the number of protons in the NMR.

COMPARATIVE EXAMPLE 3

A three-necked flask was placed in a blow box which was vacuum-aspirated and charged with argon gas, and a reflux condenser, temperature gage and dropping funnel were provided to the device. Argon gas was passed through the by-pass pipe of the dropping funnel.

100 g of dehydrated dodecane and 0.3 moles of wire-like shaped metallic sodium were introduced into the three-necked flask and heated to 100° C. while stirring. Then, a solution prepared by dissolving 0.1 moles of dichlorosilane monomer (product by Chisso Kabushiki Kaisha) in 30 g of dehydrated dodecane was dropwise and slowly added to the reaction system. After its addition being completed, the reactants were subjected to condensation polymerization at 100° C. for an hour to precipitate white solids.

After cooling, 50 ml of methanol was dropwise and slowly added to treat excessive metallic sodium. Then, the resultant was subjected to filtration to thereby separate the white solids, which were repeatedly washed with n-hexane and methanol, to thereby obtain a polysilane compound No. D-3 shown in Table 4.

This polysilane compound was insoluble in organic solvents such as toluene, chloroform, THF, etc. Thus, its determination was performed by FT-IR. The results obtained were as shown in Table 4.

COMPARATIVE EXAMPLE 4

A three-necked flask was placed in a blow box which was vacuum-aspirated and charged with argon gas, and a reflux condenser, temperature gage and dropping funnel were provided to the device. Argon gas was passed through the by-pass pipe of the dropping funnel.

100 g of dehydrated dodecane and 0.3 moles of wire-like shaped metallic sodium were introduced into the three-necked flask and heated to 100° C. while stirring. Then, a solution prepared by dissolving 0.1 moles of dichlorosilane monomer (product by Chisso Kabushiki Kaisha) in 30 g of dehydrated dodecane was dropwise and slowly added to the reaction system. After its addition being completed, the reactants were subjected to condensation polymerization at 100° C. for an hour to precipitate white solids.

After cooling, 50 ml of methanol was dropwise and slowly added to treat excessive metallic sodium. The resultant was subjected to filtration to obtain the white solids, which were repeatedly washed with n-hexane and methanol to obtain a polysilane compound No. D-4 shown in Table 4.

This polysilane compound was insoluble in organic solvents such as toluene, chloroform, THF, etc. Thus, its determination was performed by FT-IR. The results obtained were as shown in Table 4.

APPLICATION EXAMPLES

Application Example 1-1

In the following, there will be described an example wherein the polysilane compound of the present invention is used as a resist material.

Phenol novolak resin (AZ B50J: product by Shipray Co., Ltd.) was applied onto a silicon substrate to form a coat of 2 $\mu$m in thickness by a spin coating method, which was followed by heating at 150° C. for 30 minutes. Then, a liquid obtained by dissolving 5 parts by weight of the polysilane compound No. 1 obtained in Example 1 and 0.5 parts by weight of p-hydroquinone in toluene was applied to form a polysilane layer of 0.3 $\mu$m in thickness by the spin coating method, which was baked at 90° C. for 30 minutes to prepare a composited resist layer. This was irradiated with UV rays from a xenon lamp of 500 W through a quartz mask of 0.2 $\mu$m and 0.5 $\mu$m in line widths for 30 seconds. The resultant was developed by immersing it in a mixed solvent composed of toluene and isopropyl alcohol (with the quantitative ratio 1:5) for 30 seconds, and rinsed with ispropyl alcohol to thereby obtain a positive resist pattern of 0.2 $\mu$m and 0.5 $\mu$m in line widths. This was then subjected to oxygen plasma etching to dry-etch the lower organic layer. There could be formed a resist pattern having a 0.2 $\mu$m line width and a 0.5 $\mu$m line width which is of an aspect ratio being more than 2.

The film-forming ability and the developing property of a resist pattern were evaluated with respect to this polysilane compound, and the evaluated results were shown in Table 5. Further, the polysilane compound was dissolved in methane, and set to a spectrophotometer (U-3400, product by Hitachi, Ltd.) to measure its ultraviolet absorption spectrum. The resultant maximum absorption wavelength ($\lambda$ max) was shown in Table 5.

Application Examples 1-2 to 1-18

The procedures of Application Example 1-1 were repeated, except that the polysilane compound was replaced by one of the polysilane compounds Nos. 2 to 14 and D-1 to D-4, to form resist patterns, which were evaluated.

The evaluated results were shown in Table 5.

Application Example 2-1

There was prepared an electrophotographic photosensitive member of the type shown in FIG. 2.

As the substrate 201, there was used an aluminum substrate of 10 cm × 10 cm in size and 50 $\mu$m in thickness. Firstly, a charge-generating layer 202 was formed on the aluminum substrate in the following manner. That is, 10 parts by weight of chloroaluminumphthalocyanine and 5 parts by weight of polyvinyl butyral were dispersed in 90 parts by weight of methyl ethyl ketone in a ball mill to prepare a coating composition for the charge-generating layer 202. The resultant coating composition was applied onto the surface of the aluminum substrate in an amount to provide a 0.3 μm thickness when dried, to form a liquid coat thereon by means of a wire bar coater. The liquid coat was dried to form a 0.3 μm thick charge-generating layer 202. Then, 20% by weight of the polysilane compound obtained in Example 1 (the polysilane compound No. 1 shown in Table 4) was dissolved in 80% by weight of toluene to prepare a coating liquid for the formation of a charge-transporting layer 203. The resultant coating liquid was applied onto the surface of the previously formed charge-generating layer in an amount to provide a 10 μm thickness when dried by means of a wire bar coater to form a liquid coat thereon, which was followed by drying to form a 10 μm thick charge-transporting layer 203. Thus, there was obtained an electrophotographic photosensitive member (Sample No. 1). The resultant electrophotographic photosensitive member sample was evaluated with respect to various viewpoints.

That is, the electrophotographic photosensitive member was set to an electro-static copying sheet test device Model SP-428 (product by Kawaguchidenki Kabushiki Kaisha), and in the static system, it was engaged in corona charging at −5 KV, after being kept in dark for 1 sec., subjected to exposure with an illumination intensity of 2.5 lux to thereby observe its photosensitivity, further subjected to intensive exposure (illumination intensity: 2.0 lux.sec.) and destaticized.

As for its charging property, the exposure quantity required for attenuating the potential ($V_1$) after 1 sec. since the corona charging to a ½ was measured.

In addition, there were observed an initial residual potential $V^o{}_{SL}$ and a residual potential $V_{SL}$ after the intensive exposure.

Further in addition, the electrophotographic photosensitive member sample was put on a cylinder for the photosensitive drum of a PPC copying machine NP-150Z (product by CANON Kabushiki Kaisha), and the resultant was set to said copying machine to repeatedly conduct image-reproduction. And the resultant initial image and the resultant last image after 500 shots were evaluated. The electrophotographic photosensitive member sample on the cylinder for the photosensitive drum after 500 image reproduction shots was taken out from the copying machine, said photosensitive member sample was removed from said cylinder and it was set to the foregoing electro-static copying sheet test device Model SP 428 to observe its charging characteristics. And a variation ($\Delta V_{SL}$) of the residual potential ($V_{SL}$) was measured.

The results were as shown in Table 6.

Application Examples 2-2 to 2-5

There were prepared four kinds of electrophotographic photosensitive member samples of the type shown in FIG. 2 (Samples Nos. 2 to 5) respectively in the same manner as in the case of Application Example 2-1, except for using one of the polysilane compounds obtained in Examples 2, 3, 4 and 5 (the polysilane compounds No. 2, 3, 4 and 5 shown in Table 4) for the formation of the charge-transporting layer in each case.

Each of the resultant photosensitive member samples was evaluated in the same manner as in the case of Application Example 2-1.

The evaluated results obtained were as shown in Table 6.

Comparative Example 2-1

There was prepared an electrophotographic photosensitive member sample of the type shown in FIG. 2 (Sample No. E-1) in the same manner as in the case of Application Example 2-1, except for using the polysilane compound obtained in Comparative Example 1 (the polysilane compound No. D-1 shown in Table 4) for the formation of the charge-transporting layer.

The resultant photosensitive member sample was evaluated in the same manner as in the case of Application Example 2-1. The evaluated results obtained were as shown in Table 6.

Application Examples 2-6 to 2-10

There were prepared five kinds of electrophotographic photosensitive member samples of the type shown in FIG. 2 (Samples Nos. 6 to 10) respectively in the same manner as in the case Application Example 2-1, except for using one of the polysilane compounds obtained in Examples 6, 7, 8, 9 and 10 (the polysilane compounds No. 6, 7, 8, 9 and 10 shown in Table 4) for the formation of the charge-transporting layer in each case.

Each of the resultant photosensitive member samples was evaluated in the same manner as in the case of Application Example 2-1.

The evaluated results obtained were as shown in Table 6.

Comparative Example 2-2

An attempt was made to prepare an electrophotographic photosensitive member sample of the type shown in FIG. 2 (Sample No. E-2). The procedures up to forming the charge-generating layer followed Application Example 2-1. Then, the polysilane compound obtained in Comparative Example 2 (the polysilane compound No. D-2 shown in Table 4) was dissolved in toluene to prepare a coating liquid for the formation of a charge-transporting layer 203. The coating liquid was applied onto the surface of the previously formed charge-generating layer 202 in an amount to provide a thickness of 10 μm to form a liquid coat, which was followed by drying. As a result, cracks were caused at the layer being dried. Thus, there could not be obtained a practically acceptable photosensitive member.

Application Examples 2-11 to 2-14

There were prepared four kinds of electrophotographic photosensitive members (Samples Nos. 11 to 14) of the type shown in FIG. 2.

As the substrate 201, there was used an aluminum substrate of 10 cm × 10 cm in size and 50 μm in thickness in each case.

The charge-generating layer 202 was formed as follows in each case. 10 parts by weight of a diazo pigment represented by the under-mentioned formula (I) and 5 parts by weight of polyvinyl butyral were dispersed into 90 parts by weight of methyl ethyl ketone in a ball mill to thereby prepare a coating composition. The coating composition was applied onto the surface of the foregoing aluminum substrate in an amount to provide a thickness of 0.2 μm when dried to form a liquid coat by means of a wire bar coater, which was followed by drying to thereby form a 0.2 μm thick charge-generating layer 202. As for the formation of the charge-transporting layer 203, the kind of a polysilane compound to be used was changed in each case. That is, there were used the polysilane compounds obtained in Examples 11 to 14 (the polysilane compounds Nos. 11 to 14 shown in Table 4). The formation of the charge-transporting layer 203 using one of these polysilane compounds was carried out in the same manner as in the case of Application Example 2-1. Each of the resultant photosensitive member samples was evaluated in the same manner as in the case of Application Example 2-1.

The evaluated results obtained were as shown in Table 6.

Application Examples 2-15 to 2-19

There were prepared five kinds of electrophotographic photosensitive members (Samples Nos. 15 to 19) of the type shown in FIG. 2.

As the substrate 201, there was used an aluminum substrate of 10 cm × 10 cm in size and 50 μm in thickness in each case.

The charge-generating layer 202 was formed as follows in each case. 10 parts by weight of a diazo pigment represented by the under-mentioned formula (II) and 5 parts by weight of polycarbonate were dispersed into 90 parts by weight of tetrahydrofuran in a ball mill to thereby prepare a coating composition. The coating composition was applied onto the surface of the forego-

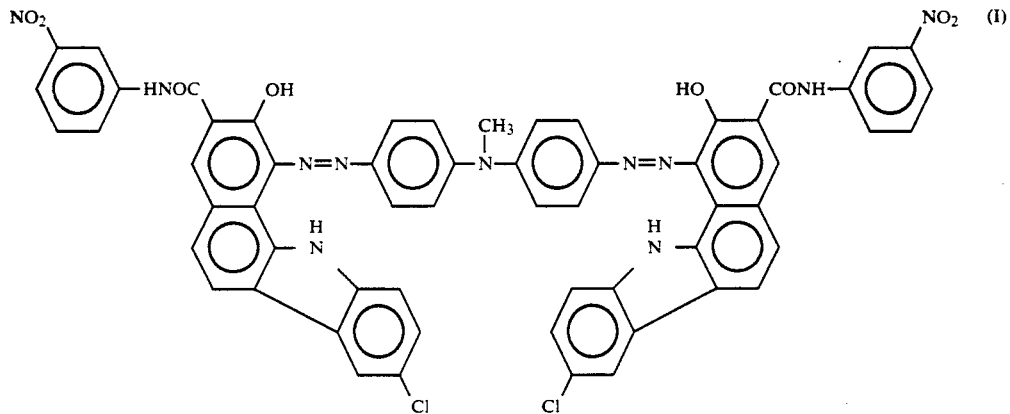

Comparative Example 2-3 and 2-4

Two kinds of electrophotographic photosensitive members (Samples Nos. E-3 and E-4) were tried to obtain by repeating the procedures of Application Example 2-1, except for using one of the polysilane compounds obtained in Comparative Examples 3 and 4 (the polysilane compounds Nos. D-3 and D-4 shown in Table 4) for the formation of the charge-transporting layer. However, any of the polysilane compounds Nos. D-3 and D-4 was insoluble in the organic solvent intended to use and it was impossible to obtain a practically applicable photosensitive member.

ing aluminum substrate in an amount to provide a thickness of 0.3 μm when dried to form a liquid coat by means of a wire bar coater, which was followed by drying to thereby form a 0.3 μm thick charge-generating layer 202. As for the formation of the charge-transporting layer 203, the kind of a polysilane compound to be used was changed in each case. That is, there were used the polysilane compounds obtained in Examples 1 to 5 (the polysilane compounds Nos. 1 to 5 shown in Table 4). The formation of the charge-transporting layer 203 using one of these polysilane compounds was carried out in the same manner as in the case of Application Example 2-1. Each of the resultant photosensitive member samples was evaluated in the same manner as in the case of Application Example 2-1.

The evaluated results obtained were as shown in Table 6.

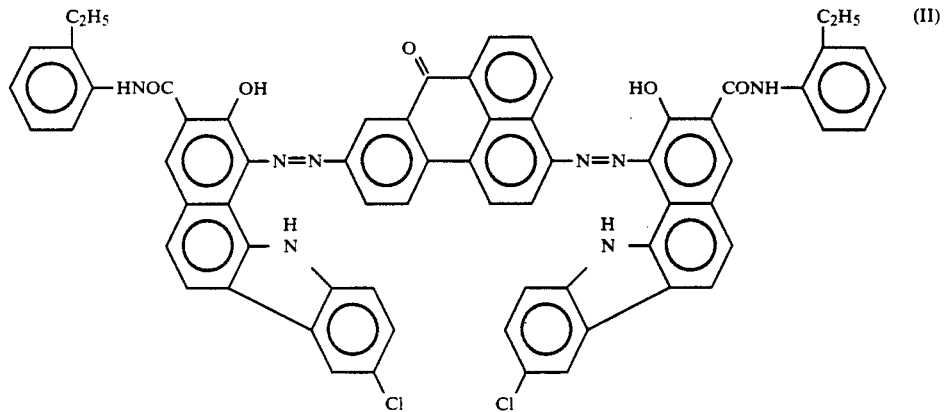

Application Example 2-20

There was prepared an electrophotographic photosensitive member of the type shown in FIG. 3 (Sample No. 20).

There was used an aluminum substrate of 10 cm×10 cm in size and 5 um in thickness as the substrate 301. Firstly, there was formed a charge-transporting layer 302 on the surface of said aluminum substrate. That is, 20 parts by weight of the polysilane compound obtained in Example 1 (the polysilane compound No. 1 shown in Table 4) was dissolved in 80 parts by weight of toluene to prepare a coating liquid for the formation of charge-transporting layer 302. The coating liquid was applied onto the surface of said aluminum substrate in an amount to provide a thickness of 10 μm to form a liquid coat by means of a wire bar coater, which was followed by drying to form a 10 μm thick charge-transporting layer 302. Then, 5 parts by weight of dibromoanthanthrone represented by the under-mentioned formula (III)(Hoechst Co., Ltd.) and 10 parts by weight of the foregoing polysilane compound No. 1 were dispersed in 80 parts by weight of toluene in a ball mill to prepare a coating composition for the formation of a charge-generating layer 303. The coating composition was applied onto the surface of the previously formed charge-transporting layer 302 in an amount to provide a thickness of 3 μm to form a liquid coat by means of a wire bar coater, which was followed by drying to form a 3 μm thick charge-generating layer 303. Thus, there was obtained an electrophotographic photosensitive member (Sample No. 20). The electrophotographic photosensitive member sample obtained was evaluated in the same manner as in the case of Application Example 2-1. The evaluated results obtained were as shown in Table 6.

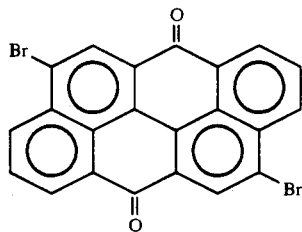

(III)

Comparative Example 2-5

There was prepared an electrophotographic photosensitive member of the type shown in FIG. 3 (Sample No. E-5) by repeating the procedures of Application Example 2-20, except that the material for the formation of the charge-transporting layer 302 was replaced by the polysilane compound obtained in Comparative Example 1 (the polysilane compound No. D-1 shown in Table 4). The electrophotographic photosensitive member sample obtained was evaluated in the same manner as in the case of Application Example 2-1.

The evaluated results obtained were as shown in Table 6.

Comparative Examples 2-6 to 2-20

The procedures of Application Example 20 were repeated, except that the polysilane compound No. 1 was replaced by the foregoing polysilane compound No. D-1 in the formation of the charge-generating layer 303, to thereby prepare an electrophotographic photosensitive member (Sample No. E-6). The electrophotographic photosensitive member sample obtained was evaluated in the same manner as in the case of Application Example 2-1. The evaluated results obtained were as shown in Table 6.

Application Example 2-21

There was prepared electrophotographic photosensitive member of the type shown in FIG. 1 (Sample No. 21).

There was used an aluminum substrate of 10 cm×10 cm in size and 5 μm in thickness as the substrate 101.

5 parts by weight of perylene (trade name: NOBO-PERMRED BL, product by Hoechst Co., Ltd.) having the following structural formula (IV) and 20 parts by weight of the polysilane compound obtained in Production Example 14 (the polysilane compound No. 14 shown in Table 14) were dispersed into 75 parts by weight of toluene in a ball mill to prepare a coating composition. The coating composition was applied onto the surface of said aluminum substrate in an amount to provide a thickness of 12 μm when dried to form a liquid coat by means of a wire bar coater, which was followed by drying to form a 12 μm thick photosensitive layer 102. Thus, there was prepared an electrophotographic photosensitive member (Sample No. 21). The electrophotographic photosensitive member sample obtained was evaluated in the same manner as in the case of Application Example 2-1. The evaluated results obtained were as shown in Table 6.

Comparative Example 2-7

The procedures of Application Example 2-21 were repeated, except that the polysilane compound No. 14 was replaced by the foregoing polysilane compound No. D-1, to thereby obtain an electrophotographic photosensitive member (Sample No. E-7).

The electrophotographic photosensitive member sample obtained was evaluated in the same manner as in the case of Application Example 2-1. The evaluated results obtained were as shown in Table 6.

TABLE 1

| | dichlorosilane monomer | terminal group treating agent |
|---|---|---|
| Example 4 | a-7 0.1 mole | b-8 0.01 mole |
| Example 5 | a-7 0.1 mole | b-5 0.01 mole |
| Comparative example 1 | a-7 0.1 mole | — |

TABLE 2

| | dichlorosilane monomer | dichlorosilane condensation period (minute) | terminal group treating agent |
|---|---|---|---|
| Example 6 | a-13 0.1 mole | 180 | b-3 0.01 mole |
| Example 7 | a-13 0.1 mole | 120 | b-7 0.01 mole |
| Example 8 | a-13 0.1 mole | 90 | b-12 0.01 mole |
| Example 9 | a-13 0.1 mole | 60 | b-8 0.01 mole |
| Example 10 | a-13 0.1 mole | 30 | b-5 0.01 mole |
| Comparative example 2 | a-13 0.1 mole | 10 | b-3 0.01 mole |

TABLE 3
| | dichlorosilane monomer | | | | terminal group treating agent | |
|---|---|---|---|---|---|---|
| Example 11 | a-1 | 0.05 mole | a-7 | 0.05 mole | b-15 | 0.01 mole |
| Example 12 | a-1 | 0.05 mole | a-7 | 0.05 mole | b-7 | 0.01 mole |
| Example 13 | a-7 | 0.05 mole | a-19 | 0.05 mole | b-3 | 0.01 mole |
| Example 14 | a-7 | 0.05 mole | a-19 | 0.05 mole | b-8 | 0.01 mole |
| Comparative example 3 | (CH$_3$)$_2$SiCl$_2$ | 0.1 mole | | | — | — |
| Comparative example 4 | 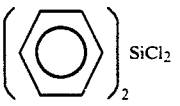 | 0.1 mole | | | — | — |

TABLE 4

| | polysilane compound No. | formula $A\text{-}(Si)_n\text{-}(Si)_m\text{-}A$ with $R_1, R_2, R_3, R_4$ | yield [%] | M.W. | FT-NMR H δ [ppm] | | FT-IR [cm$^{-1}$] | | Cl radical (millimolar equivalent in 1000 g) |
|---|---|---|---|---|---|---|---|---|---|
| Example 1 | 1 | CH$_3$(CH$_2$)$_5$-(Si(CH$_3$)(C$_6$H$_5$))$_n$-(Si(CH$_3$)(CH$_2$)$_5$CH$_3$)$_m$- | 65 | 75,000 | Si—CH$_3$ <br> Si—C$_6$H$_5$ <br> —CH$_3$ <br> Si—CH$_2$ <br> —(CH$_2$)— | 0.60 <br> 7.21 <br> 1.10 <br> 1.10 <br> 1.61 | Si—CH$_3$ <br> Si—C$_6$H$_5$ <br> —CH$_3$ <br> —(CH$_2$)— | 2960, 2862 <br> 1610, 1433, 1020 <br> 1470 <br> 1456 | 0.00 |
| Example 2 | 2 | (C$_6$H$_5$)$_3$C—Si(CH$_3$)(C$_6$H$_5$)— | 72 | 92,000 | Si—CH$_3$ <br> Si—C$_6$H$_5$ | 0.60 <br> 7.21 | Si—CH$_3$ <br> Si—C$_6$H$_5$ <br> Si—C(C$_6$H$_5$)$_2$ | 2960, 2862 <br> 1610, 1434, 1022 <br> 735 | 0.00 |
| Example 3 | 3 | (C$_6$H$_5$)$_2$CH—CH$_2$—Si(CH$_3$)(C$_6$H$_5$)—CH$_2$— | 61 | 47,000 | Si—CH$_3$ <br> Si—C$_6$H$_5$ <br> Si—CH$_2$— <br> —C$_6$H$_5$ | 0.60 <br> 7.21 <br> 1.78 <br> 7.25 | Si—CH$_3$ <br> Si—C$_6$H$_5$ <br> Si—CH$_2$— | 2960, 2861 <br> 1610, 1434, 1022 <br> 1456 | 0.00 |

TABLE 4-continued

| | polysilane compound No. | formula $A+Si_{\overline{\phantom{n}}}^{R_1}_{R_2}+Si_{\overline{\phantom{m}}}^{R_3}_{R_4}-A$ | yield [%] | M.W. | FT-NMR H δ [ppm] | FT-IR [cm$^{-1}$] | Cl radical (millimolar equivalent in 1000 g) |
|---|---|---|---|---|---|---|---|
| Example 4 | 4 | (structure: Si with CH$_3$, p-tolyl, phenyl, p-tolyl groups) | 60 | 51,000 | 0.60 (Si—CH$_3$); 7.20 (phenyl, tolyl); 2.26 (CH$_3$ on tolyl) | 2960, 2861 (Si—CH$_3$); 1610, 1434, 1022 (phenyl, tolyl); 1455 | 0.00 |
| Example 5 | 5 | (structure: Si with CH$_3$, phenyl, cyclohexyl) | 62 | 49,000 | 0.60 (Si—CH$_3$); 7.20 (phenyl); 2.03, 1.57 (cyclohexyl) | 2960, 2862 (Si—CH$_3$); 1610, 1434, 1020 (phenyl); 2930, 1355, 1170 (cyclohexyl) | 0.00 |
| Comparative example 1 | D-1 | Cl—(Si(CH$_3$)(phenyl))$_n$—Cl | 60 | 46,000 | 0.60 (Si—CH$_3$); 7.20 (phenyl) | 2960, 2862 (Si—CH$_3$); 1610, 1434, 1020 (phenyl); 530 (Si—Cl); 1110 (Si—O—Si) | 38.0 |

TABLE 4-continued

| | polysilane compound No. | formula | yield [%] | M.W. | FT-NMR Hδ [ppm] | FT-IR [cm$^{-1}$] | Cl radical (millimolar equivalent in 1000 g) |
|---|---|---|---|---|---|---|---|
| Example 6 | 6 | $A\!\!-\!\!(Si)_n\!\!-\!\!(Si)_m\!\!-\!\!A$ with $R_1, R_2, R_3, R_4$; CH$_3$(CH$_2$)$_5$–Si(CH$_3$)(cyclohexyl)–(CH$_2$)$_5$CH$_3$ | 58 | 120,000 | Si—CH$_3$ 0.60; Si-cyclohexyl 1.58, 2.04; Si—CH$_2$—CH$_3$ 1.10; —(CH$_2$)$_5$— 1.6 | Si—CH$_3$ 2960, 2880; Si-cyclohexyl 2930, 2958, 1450, 1170; C—CH$_3$ 1470 | 0.00 |
| Example 7 | 7 | (phenyl)$_2$Si(CH$_3$)–cyclohexyl structure | 61 | 72,000 | Si—CH$_3$ 0.60; Si-cyclohexyl 1.58, 2.04; Si-phenyl 7.22 | Si—CH$_3$ 2960, 2881; Si-cyclohexyl 2930, 2958, 1451, 1172; Si-phenyl 1600, 1434, 1022 | 0.00 |
| Example 8 | 8 | (phenyl)CH$_2$–Si(CH$_3$)–CH$_2$(phenyl)–cyclohexyl structure | 72 | 69,000 | Si—CH$_3$ 0.60; Si-cyclohexyl 1.58, 2.04; Si—CH$_2$— 1.78; CH$_2$-phenyl 7.25 | Si—CH$_3$ 2960, 2880; Si-cyclohexyl 2930, 2958, 1451, 1172; Si—CH$_2$— 1456; CH$_2$-phenyl 1590 | 0.00 |

TABLE 4-continued

| | polysilane compound No. | formula $A\text{-}(Si)_n\text{-}(Si)_m\text{-}A$ with $R_1, R_2 / R_3, R_4$ | yield [%] | M.W. | FT-NMR H6 [ppm] | FT-IR [cm⁻¹] | Cl radical (millimolar equivalent in 1000 g) |
|---|---|---|---|---|---|---|---|
| Example 9 | 9 | Si with CH₃ and two p-tolyl groups, and cyclohexyl | 45 | 46,000 | Si—CH₃ 0.60; cyclohexyl (1.58, 2.04); phenyl 7.20; Ar—CH₃ 2.26 | Si—CH₃ 2960, 2880; Si-cyclohexyl (2930, 2958, 1451, 1172); Si-phenyl 1630, 1455; Ar-CH₃ 1455 | 0.00 |
| Example 10 | 10 | Si with CH₃ and two cyclohexyl groups | 50 | 8,000 | Si—CH₃ 0.60; cyclohexyl (1.58, 2.04) | Si—CH₃ 2960, 2880; Si-cyclohexyl (2930, 2958, 1451, 1172) | 0.00 |
| Comparative Example 2 | D-2 | $CH_3(CH_2)_5\text{-}(Si)_n\text{-}(CH_2)_5CH_3$ with CH₃ and cyclohexyl | 30 | 3,000 | Si—CH₃ 0.60; cyclohexyl (1.58, 2.04); Si—CH₂—CH₃ 1.10; —(CH₂)₅— 1.60 | Si—CH₃ 2960, 2880; Si-cyclohexyl (2930, 2958, 1450, 1170); C—CH₃ 1470 | 0.00 |

TABLE 4-continued

| polysilane compound No. | formula $A+Si)_n+Si)_m-A$ with $R_1, R_2, R_3, R_4$ | yield [%] | M.W. | FT-NMR H6 [ppm] | | FT-IR [cm$^{-1}$] | | Cl radical (millimolar equivalent in 1000 g) |
|---|---|---|---|---|---|---|---|---|
| Example 11 | 11 | $\begin{array}{c}CH_3\ \ \ CH_3\\|\ \ \ \ \ \ \ \ \ \ |\\CH_3(CH_2)_{10}+Si\rightarrow_{0.5}+Si\rightarrow_{0.5}-(CH_2)_{10}CH_3\\|\ \ \ \ \ \ \ \ \ \ |\\CH_3\ \ \ \text{cyclohexyl}\end{array}$ | 55 | 71,000 | Si—CH$_3$ cyclohexyl-Si Si—CH$_2$—CH$_3$ —(CH$_2$)$_{10}$— | 0.60 {1.58, 2.04} 1.10 1.60 | Si—CH$_3$ cyclohexyl-Si C—CH$_3$ | 2960, 2880 {2930, 2958, 1450, 1170} 1470 | 0.00 |
| Example 12 | 12 | $\begin{array}{c}CH_3\ \ \ CH_3\\|\ \ \ \ \ \ \ \ \ \ |\\\text{Ph-}Si+Si\rightarrow_{0.5}+Si\rightarrow_{0.5}-Si\text{-Ph}\\|\ \ \ \ \ \ \ \ \ \ |\\CH_3\ \ \ \text{cyclohexyl}\end{array}$ (with phenyl groups) | 60 | 59,000 | Si—CH$_3$ cyclohexyl-Si phenyl-Si | 0.60 {1.58, 2.04} 7.22 | Si—CH$_3$ cyclohexyl-Si phenyl-Si | 2960, 2881 {2931, 2958, 1451, 1172} {1600, 1434, 1022} | 0.00 |
| Example 13 | 13 | $\begin{array}{c}CH_3\ \ \ \ (CH_2)_3\\|\ \ \ \ \ \ \ \ \ \ |\\CH_3(CH_2)_5+Si\rightarrow_{0.5}+Si\rightarrow_{0.5}-(CH_2)_5CH_3\\|\ \ \ \ \ \ \ \ \ \ |\\CH_3\ \ \ (CH_2)_3\\ \ \ \ \ \ \ \ \ \ \ \ \ CH_3\end{array}$ with cyclohexyl | 63 | 69,000 | Si—CH$_3$ cyclohexyl-Si Si—CH$_2$—CH$_3$ —(CH$_2$)$_{10}$— | 0.60 {1.58, 2.04} 1.10 1.60 | Si—CH$_3$ cyclohexyl-Si C—CH$_3$ | 2960, 2880 {2930, 2958, 1450, 1170} 1470 | 0.00 |

TABLE 4-continued

| polysilane compound No. | formula $A+Si_{n}^{R_1}+Si_{m}^{R_3}-A$ $\quad R_2 \quad R_4$ | yield [%] | M.W. | FT-NMR Hδ [ppm] | FT-IR [cm⁻¹] | Cl radical (millimolar equivalent in 1000 g) |
|---|---|---|---|---|---|---|
| Example 14 — 14 | (structure with CH₃, (CH₂)₃, cyclohexyl, tolyl groups) | 62 | 58,000 | Si—CH₃  0.60<br>cyclohexyl  (1.58, 2.04)<br>Si—CH₂—CH₃, —(CH₂)₃—  1.10<br>phenyl-CH₃  1.60<br>phenyl  7.20<br>CH₃ (tolyl)  2.26 | Si—CH₃  2961, 2880<br>cyclohexyl  (2931, 2958, 1450, 1170)<br>C—CH₃  1470<br>phenyl  1630, 1455 | 0.00 |
| Comparative example 3 — D-3 | $CH_3$<br>$Cl+Si+_{n}-Cl$<br>$CH_3$ | 30 | — | — | Si—CH₃  2960, 2880<br>Si—Cl  530<br>Si—O—Si  1110 | |
| Comparative example 4 — D-4 | (diphenyl structure)<br>$Cl+Si+_{n}-Cl$ | 25 | — | — | phenyl  1610, 1434, 1020<br>Si—Cl  528<br>Si—O—Si  1110 | |

TABLE 5

| application example | polysilane No. | solubility (toluene) | film-forming ability | resist development | λ max [nm] |
|---|---|---|---|---|---|
| 1-1 | 1 | ○ | ⊙ | ⊙ | 337 |
| 1-2 | 2 | ○ | ○ | ○ | 337 |
| 1-3 | 3 | ○ | ○ | ○ | 337 |
| 1-4 | 4 | ○ | ○ | ○ | 337 |
| 1-5 | 5 | ○ | ⊙ | ⊙ | 337 |
| 1-6 | D-1 | ○ | ○ | x | 337 |
| 1-7 | 6 | ○ | ⊙ | ⊙ | 321 |
| 1-8 | 7 | ○ | ○ | ○ | 321 |
| 1-9 | 8 | ○ | ○ | ○ | 321 |
| 1-10 | 9 | ○ | ○ | ○ | 321 |
| 1-11 | 10 | ○ | ○ | Δ | 321 |
| 1-12 | D-2 | ○ | x | x | 321 |
| 1-13 | 11 | ○ | ⊙ | ⊙ | 304 |
| 1-14 | 12 | ○ | ○ | ○ | 304 |
| 1-15 | 13 | ○ | ⊙ | ⊙ | 306 |
| 1-16 | 14 | ○ | ○ | ○ | 306 |
| 1-17 | D-3 | x | x | x | — |
| 1-18 | D-4 | x | x | x | — |

Notes

○: excellently soluble
Δ: soluble
x: not soluble

⊙: obtained a tough film not accompanied by any defect
○: obtained a practically acceptable film not accompanied by any defect
Δ: obtained a film accompanied by partial cracks
x: could not form a film ⊙: no defect with a line width of 0.2 μm
○: no defect with a line width of 0.5 μm
Δ: occurrence of non-developed portion
x: impossible to develop

TABLE 6

| | electrophotographic photosensitive member sample No. | No. of the polysilane compound used* | E ½ [lux · second] | $V^o_{SL}$** [V] | $\Delta V_{SL}$*** [V] | initial image |
|---|---|---|---|---|---|---|
| application example 2-1 | 1 | 1 | 1.0 | 0 | −3 | normal |
| application example 2-2 | 2 | 2 | 1.1 | 0 | −2 | normal |
| application example 2-3 | 3 | 3 | 1.1 | −1 | −3 | normal |
| application example 2-4 | 4 | 4 | 1.1 | 0 | −3 | normal |
| application example 2-5 | 5 | 5 | 1.1 | −1 | −3 | normal |
| comparative example 2-1 | E-1 | D-1 | 1.7 | −100 | −50 | occurrence of white dots |
| application example 2-6 | 6 | 6 | 1.2 | 0 | −3 | normal |
| application example 2-7 | 7 | 7 | 1.2 | 0 | −1 | normal |
| application example 2-8 | 8 | 8 | 1.2 | 0 | −2 | normal |
| application example 2-9 | 9 | 9 | 1.2 | −1 | −2 | normal |
| application example 2-10 | 10 | 10 | 1.3 | −3 | −5 | normal |
| comparative example 2-2 | E-2 | D-2 | — | — | — | — |
| application example 2-11 | 11 | 11 | 1.3 | 0 | −2 | normal |
| application example 2-12 | 12 | 12 | 1.3 | 0 | −2 | normal |
| application example 2-13 | 13 | 13 | 1.4 | −2 | −3 | normal |
| application example 2-14 | 14 | 14 | 1.4 | −2 | −5 | normal |
| comparative example 2-3 | E-3 | D-3 | — | — | — | — |
| comparative example 2-4 | E-4 | D-4 | — | — | — | — |
| application example 2-15 | 15 | 1 | 1.2 | 0 | −2 | normal |
| application example 2-16 | 16 | 2 | 1.2 | 0 | −2 | normal |
| application example 2-17 | 17 | 3 | 1.3 | 0 | −3 | normal |
| application example 2-18 | 18 | 4 | 1.2 | 0 | −3 | normal |
| application example 2-19 | 19 | 5 | 1.2 | 0 | −2 | normal |
| application example 2-20 | 20 | 1 | 5.4 | +10 | | |
| comparative example 2-5 | E-5 | D-1 | 1.8 | −90 | | |
| comparative example 2-6 | E-6 | D-1 | 8.9 | +150 | | |
| application example 2-21 | 21 | 9 | 7.2 | +12 | | |
| comparative example 2-7 | E-7 | D-1 | 15.3 | +180 | | |

Note:
*No. of the polysilane compound shown in Table 4
**initial residual potential
***change in the residual potential

We claim:

1. A polysilane compound (i) having a weight average molecular weight of 6000 to 200,000, (ii) free from chlorine-and oxygen-containing groups, (iii) readily soluble in organic solvents and (iv) capable of forming films, said polysilane compound represented by the general formula (I):

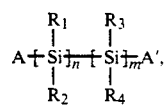

(I)

wherein $R_1$ is an alkyl group of 1 or 2 carbon atoms, $R_2$ is an alkyl group, cycloalkyl group, aryl group or aralkyl group of 3 to 8 carbon atoms, $R_3$ is an alkyl group of 1 to 4 carbon atoms, $R_4$ is an alkyl group of 1 to 4 carbon atoms, A and A' are respectively an alkyl group, cycloalkyl group, aryl group or aralkyl group of 4 to 12 carbon atoms wherein the two substituents may be the same or different, n and m respectively stands for a ratio showing the proportion of the number of a respective monomer versus the total number of a respective monomer versus the total number of the monomers in the polymer wherein $n+m=1$, $0 < n \leq 1$ and $0 \leq m < 1$.

2. A polysilane compound according to claim 1 which has a weight average molecular weight of 8000 to 120,000.

3. A polysilane compound according to claim 1, wherein A and A' are respectively an alkyl group or cycloalkyl group of 5 to 12 carbon atoms.

4. A process for producing a polysilane compound (i) having a weight average molecular weight of 6000 to 200,000, (ii) free from chlorine-and oxygen-containing groups, (iii) readily soluble in organic solvents and (iv) capable of forming films, said polysilane compound represented by the general formula I:

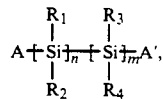

(I)

wherein, $R_1$ is an alkyl group of 1 to 2 carbon atoms, $R_2$ is an alkyl group, cycloalkyl group, aryl group or aralkyl group of 3 to 8 carbon atoms, $R_3$ is an alkyl group of 1 to 4 carbon atoms, $R_4$ is an alkyl group of 1 to 4 carbon atoms, A and A' are respectively an alkyl group, cycloalkyl group, aryl group or aralkyl group of 4 to 12 carbon atoms wherein the two substituents may be the same or different, n and m respectively stands for a ratio showing the proportion of the number of a respective monomer versus the total number of the monomers in the polymer wherein $n+m=1$, $0 < n \leq 1$, and $0 \leq m < 1$; said process comprises the steps of:

(a) contacting dichlorosilane monomer with a condensation catalyst comprising an alkaline metal to perform dehalogenation and condensation polymerization thereby synthesizing an intermediate polymer under high purity and inactive atmosphere which is free of oxygen and water, (b) separating said intermediate polymer synthesized in step (a) from unreacted monomer, and (c) reacting said separated intermediate polymer with a halogenating organic reagent selected from the group consisting of halogenated alkyl compounds, halogenated aryl compounds and halogenated aralkyl compounds, in the presence of a condensation catalyst comprising an alkaline metal to condense organic groups to the terminals of said intermediate polymer.

* * * * *

UNITED STATES PATENT AND TRADEMARK OFFICE
CERTIFICATE OF CORRECTION

PATENT NO. : 5,159,042

DATED : October 27, 1992

INVENTOR(S) : HISAMI TANAKA, ET AL.

It is certified that error appears in the above-identified patent and that said Letters Patent is hereby corrected as shown below:

COLUMN 1

Line 54, "with" should read --which-- and "being" should read --are--.

COLUMN 2

Line 38, "not" should be deleted.

COLUMN 3

Line 39, "reaction—causing" should read --reaction-causing--.
Line 40, "being" should read --are--.

COLUMN 4

Line 33, "dehaloganation" should read --dehalogenation--.

COLUMN 5

Line 54, "taken" should read --taken so--.
Line 61, "whereby" should read --thereby--.
Line 67, "power" should read --powder--.

COLUMN 6

Line 20, "take" should read --taking--.
Line 55, "us" should read --use--.

UNITED STATES PATENT AND TRADEMARK OFFICE
CERTIFICATE OF CORRECTION

PATENT NO. : 5,159,042
DATED : October 27, 1992
INVENTOR(S) : HISAMI TANAKA, ET AL.

It is certified that error appears in the above-identified patent and that said Letters Patent is hereby corrected as shown below:

COLUMN 7

Line 48, "firstly" should read --first--.

COLUMN 8

Line 22, "Wherein said" should read --Said--.
Line 24, "compete" should read --complete--.

COLUMN 17

Lines 40-41, "pyrrium" should read --pyrylium--.

COLUMN 19

Line 57, "pyrrium" should read --pyrylium--.
Line 60, "selenium arsenic" should read --selenium-arsenic--.
Line 67, "method," should read --methods,--.

COLUMN 20

Line 10, "whereby" should read --thereby--.
Line 11, "layer 203 or 303" should read --layer 202 or 303--.

COLUMN 21

Line 57, "firstly" should read --first--.
Line 61, "milimolar" should read --millimolar--.

UNITED STATES PATENT AND TRADEMARK OFFICE
CERTIFICATE OF CORRECTION

PATENT NO. : 5,159,042

DATED : October 27, 1992

INVENTOR(S) : HISAMI TANAKA, ET AL.

It is certified that error appears in the above-identified patent and that said Letters Patent is hereby corrected as shown below:

COLUMN 22

Line 56, "decantated" should read --decanted--.
Line 58, "mettalic" should read --metallic--.
Line 65, "mettalic" should read --metallic--.

COLUMN 23

Line 6, "milimolar" should read --millimolar--.
Line 41, "decantated" should read --decanted--.

COLUMN 24

Line 7, "decantated" should read --decanted--.

COLUMN 25

Line 2, "anreacted" should read --unreacted--.
Line 10, "No D-2" should read --No. D-2--.

COLUMN 26

Line 23, "(AZ B50J:" should read --(AZ-B50J:--.

COLUMN 27

Line 1, "Firstly," should read --First,--.

COLUMN 31

Line 8, "Firstly," should read --First,--.

UNITED STATES PATENT AND TRADEMARK OFFICE
CERTIFICATE OF CORRECTION

PATENT NO. : 5,159,042
DATED : October 27, 1992
INVENTOR(S) : HISAMI TANAKA, ET AL.

It is certified that error appears in the above-identified patent and that said Letters Patent is hereby corrected as shown below:

COLUMN 35
TABLE 4, " formula

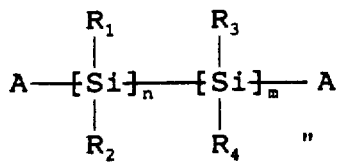

" should read

-- formula

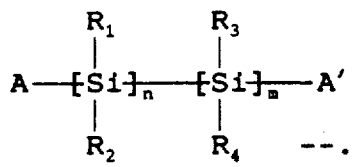

--.

COLUMN 37
TABLE 4-continued,
" formula

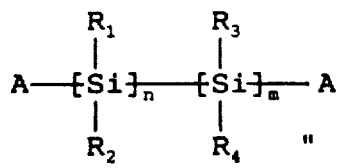

" should read

-- formula

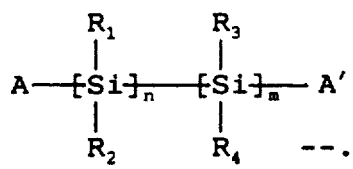

--.

UNITED STATES PATENT AND TRADEMARK OFFICE
CERTIFICATE OF CORRECTION

PATENT NO. : 5,159,042

DATED : October 27, 1992

INVENTOR(S) : HISAMI TANAKA, ET AL.

It is certified that error appears in the above-identified patent and that said Letters Patent is hereby corrected as shown below:

COLUMN 39
TABLE 4-continued,
" formula

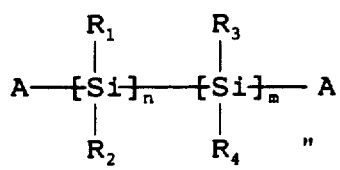

" should read

-- formula

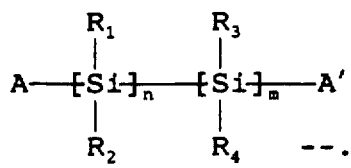

--.

COLUMN 41
TABLE 4-continued,
" formula

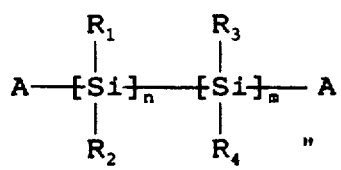

" should read

-- formula

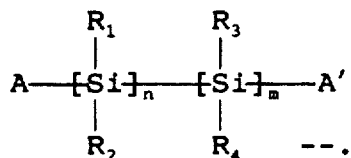

--.

UNITED STATES PATENT AND TRADEMARK OFFICE
CERTIFICATE OF CORRECTION

PATENT NO. : 5,159,042
DATED : October 27, 1992
INVENTOR(S) : HISAMI TANAKA, ET AL.

It is certified that error appears in the above-identified patent and that said Letters Patent is hereby corrected as shown below:

COLUMN 43

TABLE 4-continued,

" formula

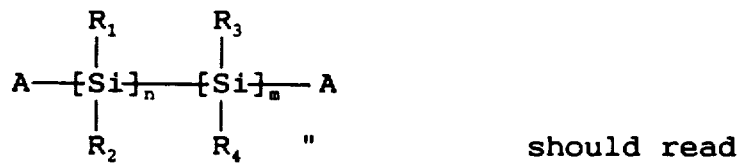

should read

-- formula

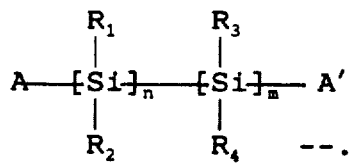

--.

UNITED STATES PATENT AND TRADEMARK OFFICE
CERTIFICATE OF CORRECTION

PATENT NO. : 5,159,042
DATED : October 27, 1992
INVENTOR(S) : HISAMI TANAKA, ET AL.

It is certified that error appears in the above-identified patent and that said Letters Patent is hereby corrected as shown below:

COLUMN 45

TABLE 4-continued,
" formula

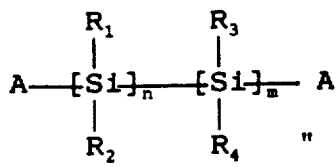

" should read

-- formula

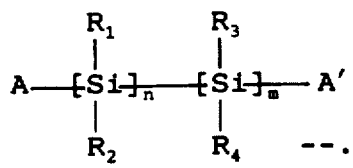

--.

Signed and Sealed this

Nineteenth Day of April, 1994

Attest:

BRUCE LEHMAN

Attesting Officer

Commissioner of Patents and Trademarks